US012732543B2

(12) United States Patent
Viswanathan et al.

(10) Patent No.: US 12,732,543 B2
(45) Date of Patent: Sep. 8, 2026

(54) AUTOMATING AND STANDARDIZING REGULATORY INTELLIGENCES AND WORKFLOWS

(71) Applicant: OneTrust LLC, Atlanta, GA (US)

(72) Inventors: Subramanian Viswanathan, San Ramon, CA (US); Milap Shah, Bangalore (IN)

(73) Assignee: OneTrust LLC, Atlanta, GA (US)

( * ) Notice: Subject to any disclaimer, the term of this patent is extended or adjusted under 35 U.S.C. 154(b) by 0 days.

(21) Appl. No.: 18/990,518

(22) Filed: Dec. 20, 2024

(65) Prior Publication Data

US 2026/0181023 A1 Jun. 25, 2026

(51) Int. Cl.
*H04L 9/40* (2022.01)
*H04L 41/0213* (2022.01)
(Continued)

(52) U.S. Cl.
CPC .......... *H04L 63/20* (2013.01); *H04L 41/0213* (2013.01); *G06Q 10/06* (2013.01); (Continued)

(58) Field of Classification Search
None
See application file for complete search history.

(56) References Cited

U.S. PATENT DOCUMENTS 12,001,694 B1 * 6/2024 Murthy ................ G06F 3/0604
2007/0113288 A1 5/2007 Blumenau
(Continued)

FOREIGN PATENT DOCUMENTS

CA 2667264 A1 * 5/2008 .......... G06F 16/907
CN 1829160 A * 9/2006
WO WO-2022115586 A1 * 6/2022 ............ G06Q 40/03

OTHER PUBLICATIONS

Elkourdi et al. "Exploring current practices and challenges of HIP AA compliance in software engineering:scoping review." IEEE Open Journal of Systems Engineering 2 (2024): 94-104. May 17, 2024 (May 17, 2024) Retrieved on Feb. 21, 2026 (Feb. 21, 2026} from <https://ieeexplore.ieee.org/stamp/stamp.jsp?arnumber=I0506964> (entire document).

*Primary Examiner* — Ali H. Cheema
(74) *Attorney, Agent, or Firm* — Ballard Spahr LLP

(57) ABSTRACT

Methods, systems, and non-transitory computer readable storage media are disclosed for utilizing a decision tree to generate a recommended action in response to detecting a change in a data map representing a computing environment. The disclosed system determines relationships among data objects representing digital data, digital assets, and data processing activities and generates a data map according to the relationships. The disclosed system monitors the data map for changes and, responsive to determining a change in the data map, traverses a decision tree by executing one or more calls to one or more application programming interfaces according to the change in the data map and one or more data policies relevant to the changes. The disclosed systems utilize the decision tree and application programming interfaces to generate a recommended action for modifying digital assets, digital data, and/or data processing activities.

19 Claims, 11 Drawing Sheets

(51) Int. Cl.
*G06Q 10/06* (2023.01)
*G06Q 10/10* (2023.01)

(52) U.S. Cl.
CPC .............. *G06Q 10/10* (2013.01); *H04L 63/04* (2013.01); *H04L 63/10* (2013.01); *H04L 63/14* (2013.01)

(56) References Cited

U.S. PATENT DOCUMENTS

| | | | | |
|---|---|---|---|---|
| 2012/0144210 | A1* | 6/2012 | Yacobi | H04L 9/088 713/193 |
| 2013/0304761 | A1 | 11/2013 | Redlich et al. | |
| 2014/0201520 | A1* | 7/2014 | Yacobi | H04L 63/045 713/158 |
| 2019/0014153 | A1* | 1/2019 | Lang | G06F 21/57 |
| 2019/0052549 | A1* | 2/2019 | Duggal | G06Q 30/0635 |
| 2019/0304012 | A1 | 10/2019 | Ramirez et al. | |
| 2019/0327271 | A1 | 10/2019 | Saxena et al. | |
| 2021/0240347 | A1 | 8/2021 | Lee et al. | |
| 2021/0367963 | A1 | 11/2021 | Murray et al. | |
| 2022/0122050 | A1 | 4/2022 | Pacella et al. | |
| 2022/0159041 | A1 | 5/2022 | Barday et al. | |
| 2022/0286482 | A1 | 9/2022 | Barday et al. | |
| 2023/0053049 | A1* | 2/2023 | Rogynskyy | G06Q 10/107 |

* cited by examiner

500
Jurisdiction Attributes 502
Policy Entities 504
Policies 506
Data Map 501
512
Access Type 532
Transfer 508
Incident Breach 510
Data Subject Access Request 518
Data Object 522
Attributes 517
Data Subject Type 514
Purpose 516
Data Category 520
Sensitivity Level 524
Control Measures 528
Policy Basis 530

AUTOMATING AND STANDARDIZING REGULATORY INTELLIGENCES AND WORKFLOWS

BACKGROUND

Advances in computer processing and data storage technologies have led to a significant increase in the amount and types of data moved to digital environments for processing and management. Specifically, many entities utilize computing devices to store, analyze, transmit, and/or perform a number of computing operations on different types of data in various computing environments. Computing systems handling (e.g., collecting, receiving, transmitting, storing, processing, sharing, and/or the like) certain types of digital data are often subject to handling such data in connection with various internal or external data storage requirements, such as security, privacy, legal, or ethical requirements. Moreover, changes in the data collected and stored by computing systems often require changes in the data storage requirements (e.g., security, privacy, legal, or ethical requirements, among others). Some entities perform operations on digital data, such as categorizing and/or labeling various data objects from digital datasets, for use in identifying data sources of specific digital data types or in downstream operations involving the digital data. For example, data processes associated with various privacy and security industries often collect, receive, transmit, store, process, or share information (e.g., personally identifiable information or "PII") covered by one or more internal or external data requirements.

In view of these requirements, conventional systems suffer from a variety of technical deficiencies, especially regarding operational flexibility, efficiency, and accuracy. Specifically, conventional systems suffer from a number of disadvantages or deficiencies with regard to managing data, including making changes to how data is handled in response to detecting changes in the data or related processes, hardware, or policy requirements. For example, conventional systems are often decentralized (e.g., across many different devices and software applications) and utilize predetermined, fixed workflows and processes to capture data, determine changes to the data or devices/processes handling the data, and perform the necessary corrective actions in response to determining changes to the data, devices, or processes. For example, conventional systems are frequently unable to make timely corrections for handling hardware failures, data breaches, or changes to digital data requirements via fixed workflows.

Moreover, conventional systems are often inefficient. For example, conventional systems often require user accounts to repetitively perform numerous operations in response to determining or otherwise detecting changes in stored data. Indeed, even small changes to stored data often create numerous repetitive workflows and processes for user accounts. Furthermore, the decentralized nature of conventional systems utilize repetitive and often unnecessary actions, workflows, and processes from user accounts and conventional systems to ensure consistency in data storage and other data processes in connection with managing compliance of data processes and hardware with various data policies. In addition, a single change to certain requirements for managing compliance can often require conventional systems to implement numerous changes to many different software applications.

Additionally, the decentralized nature of conventional systems affects the accuracy of data storage and recall.

Indeed, due to the various requirements for data processes (e.g., security, privacy, legal, and ethical requirements, among others) and the decentralized nature of conventional systems, conventional systems often inaccurately store and/or retrieve data in relation to digital data requirements. For example, implementing a data process incorrectly (e.g., due to incorrect function calls, typos, or other coding errors) can result in certain digital data being erroneously moved from a specific location or erroneously stored according to incorrect protocols or without required security protections (e.g., without required encryption, storing data beyond allowed time frames). Such errors can cause additional errors in downstream operations involving the incorrectly affected data and/or result in non-compliance issues with respect to one or more digital data requirements due to the compliance gaps in specific categories of data.

SUMMARY

This disclosure describes various aspects for providing centralized data processes. For example, the disclosed systems describe a decision tree with application programming interface calls to recommend actions based on changes to digital assets, digital data, or digital processing activities of an entity. Specifically, the disclosed system determines a data map including data objects that represent digital assets, digital data stored on the digital assets, and data processing activities involving the digital assets. Indeed, the disclosed systems uses the data map to determine changes to data objects representing core constructs relevant to one or more data policies that include information for data subject types, data objects, policy bases, purpose, consent, data categories, etc., related to the data objects. Based on the detected changes, the disclosed systems utilize a decision tree generated based on the one or more data policies to generate a recommended action for modifying the digital assets, the digital data, or the data processing activities represented by the data objects. Specifically, the disclosed systems generate the recommended action by executing one or more application programming interface calls according to the one or more changes to the one or more data objects and the digital data requirements of the one or more policies in connection with traversing the decision tree.

BRIEF DESCRIPTION OF THE DRAWINGS

Various aspects will be described and explained with additional specificity and detail through the use of the accompanying drawings.

DETAILED DESCRIPTION

This disclosure describes one or more aspects of a policy implementation system that automatically generates a recommended action for a computing environment via a decision tree in response to detecting a change in a data map. In particular, the policy implementation system determines a data map that includes a plurality of data objects corresponding to an entity. The data objects represent digital assets, digital data stored on the digital assets, and data processing activities involving the digital assets. The policy implementation system detects a change to the data map based on one or more changes to one or more data objects of the plurality of data objects. The policy implementation system utilizes a decision tree based on one or more data policies to generate a recommendation action for modifying the digital assets, the digital data, or the data processing activities for compliance with digital data requirements of the one or more data policies. Specifically, the policy implementation system generates the recommended action by executing one or more application programming interface calls according to the changed data object(s) and the digital data requirements of the one or more data policies.

Figure 1:
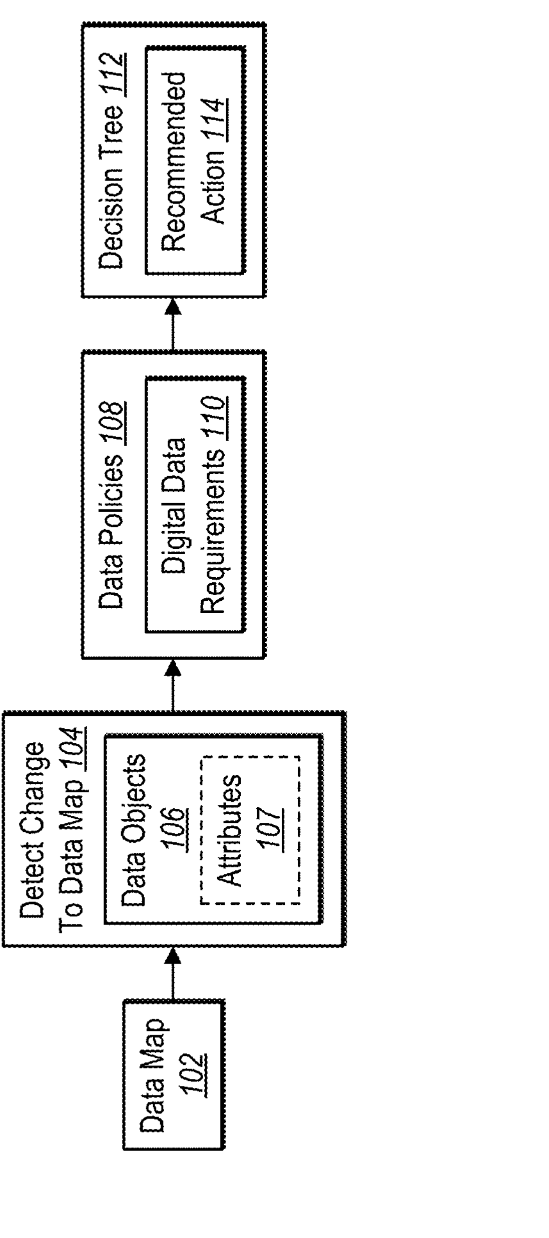
FIG. 1 illustrates an example of an overview of a policy implementation system in accordance with one or more aspects.

As shown in FIG. 1, a policy implementation system 100 determines a data map 102. For example, the policy implementation system 100 can determine the data map 102 comprising a plurality of data objects representing digital assets associated with an entity, digital data stored on the digital assets, and data processing activities involving the digital assets. To illustrate, the data map 102 includes a digital representation of relationships between the digital assets, digital data, and data processing activities of an entity, such as a graph including a plurality of nodes and edges. More information regarding the policy implementation system 100 determining the data map 102 is provided below with respect to FIG. 8.

In some embodiments, the policy implementation system 100 can perform an act 104 to detect a change to the data map 102. For example, the policy implementation system 100 can perform the act 104 by detecting one or more changes to one or more data objects 106 of the plurality of data objects in the data map 102. In one or more additional embodiments, the policy implementation system 100 determines attributes 107 of the one or more data objects 106 corresponding to the change to the data map 102 in connection with detecting the changes to the data map 102 and/or for determining specific requirements applicable to the changes to the data map 102.

Indeed, in some embodiments, the policy implementation system 100 determines one or more data policies 108 that include digital data requirements 110 that correspond to the one or more data objects 106. For example, the policy implementation system 100 can utilize the attributes 107 of the data objects 106 to determine the data policies 108 and the digital data requirements 110. To illustrate, data processes and/or data hardware involved in handling (e.g., storing, transmitting, processing) certain data types are sometimes required to adhere to specific digital data requirements, which can include requirements of how to store or transmit the data types and/or what data types are allowed to be stored, etc.

In one or more embodiments, the policy implementation system 100 determines the impacts of the digital data requirements 110 to the detected changes in the data map 102 for providing recommendations of specific actions to take to remedy gaps based the data map 102 and the digital data requirements 110. Specifically, the policy implementation system 100 can utilize a decision tree 112 generated based on the one or more data policies 108 to generate a recommended action 114 for modifying the digital assets, the digital data, or the data processing activities. For instance, the policy implementation system 100 traverses the decision tree 112 by executing one or more application programming interface calls according to the one or more changes to the one or more data objects 106 and the digital data requirements 110 of the one or more data policies 108.

In one or more aspects, the policy implementation system 100 improves upon shortcomings of conventional systems in relation to managing digital data, digital assets, and data processing activities in connection with various requirements for data policies. Indeed, the policy implementation system 100 improves operational flexibility compared to conventional systems. In contrast to conventional systems that use decentralized, predetermined workflows to process and capture data for individually managing a plurality of different software applications or computing environments, the policy implementation system 100 dynamically applies data policies including digital data requirements to digital data, digital assets, and data processing activities of an entity based on one or more changes to one or more data objects of a data map representing the digital data, digital assets, and data processing activities. The policy implementation system 100 further utilizes the data policies with a set of application programming interface calls to traverse a decision tree to determine recommended actions according to the one or more changes to the one or more data objects and the digital data requirements of the one or more policies.

Moreover, the policy implementation system 100 improves efficiency compared to conventional systems. Indeed, rather than requiring separate instances of software tools implemented in separate, individual data processing systems, the policy implementation system 100 integrates and centralizes a set of software tools to manage recommendations and changes for different components of a plurality of existing data processing systems. Thus, the policy implementation system 100 reduces the computational resources required to update and/or aggregate data across different data processing systems via changes to the single set of software tools.

Additionally, the policy implementation system 100 improves accuracy compared to conventional systems. Indeed, by integrating and centralizing gap detection and correction in multiple data processing systems, the policy implementation system 100 ensures that the data processing systems are consistent with regard to various data policies. In contrast to conventional systems that often result in inconsistent or contradictory changes to data processes due to modifying separate data processes in a plurality of different operations, the policy implementation system 100 performs accurate and consistent changes to separate data processes via a centralized set of tools. In particular, the policy implementation system 100 implements regulatory intelligence across a plurality of different data processing systems by leveraging a decision tree with various application programming interface calls to accurately determine actions to take in response to changes to data policies and/or to a data map. The policy implementation system 100 thus ensures that a plurality of separate data processes meet various policy requirements in a consistent and a timely manner.

As illustrated by the foregoing discussion, the present disclosure utilizes a variety of terms to describe features and benefits of the policy implementation system. Additional detail is hereafter provided regarding the meaning of these terms as used in this disclosure. As used herein, the term "data object" refers to a digital object representation for tracking and storing information associated with managing systems, software, data sources, entities, or other functions or infrastructure involved in handling specified data in a computing environment for an entity. For example, a data object can include a digital representation of the entity itself, a sub-entity such as a subsidiary of the entity, a business unit of the entity, a digital asset, a project, a dataset, digital content items in a dataset, a computing operation such as a data process, or a node or attribute of a graph-based taxonomy (e.g., a "data map"). Data objects can include node data objects representing nodes in a graph-based taxonomy or attribute data objects representing attributes of nodes in the graph-based taxonomy. Additionally, in some aspects, the policy implementation system 100 utilizes different types of data objects to represent different types of components, such as a digital asset object representing a digital asset (e.g., hardware device or cluster of devices, a software application, a website), a dataset object to represent a dataset, a document object to represent a digital document, a processing activity representing a data processing activity, a digital data object representing digital data handled by digital assets or data processing activities, etc. In additional aspects, data objects include, but are not limited to, control objects representing controls for data policies, evidence objects representing evidence tasks for collecting evidence of implemented controls, or digital assets (e.g., computing components) on which data processes operate. Furthermore, in some embodiments, data objects represent different elements of a data policy, such that a regulatory map includes nodes comprising the different elements with edges indicating relationships between the elements.

Additionally, as used herein, the term "data policy" refers to a set of standards or laws for handling specific data types. To illustrate, data policies can include, for example, an external set of digital data requirements for handling specific types of data in connection with a set of practices established by a regulatory body such as the International Organization for Standardization ("ISO"), internally by a particular organization (e.g., a multinational corporation), or a territory government (e.g., the European Union). Additionally, a data policy can include internal digital data requirements for handling data within computing devices associated with a single entity. Such internal digital data requirements can incorporate third-party requirements (e.g., replicating or inserting a requirement specified in an ISO standard or in a legal authority for a certain jurisdiction), be based on third-party requirements (e.g., a requirement meeting criteria specified in multiple third-party frameworks or by different legal authorities in different jurisdictions), and/or be independent of any third-party requirements (e.g., policies developed by an entity without reliance on third-party frameworks or that are not required by any legal authority).

Further, as used herein, the term "control" refers to a tool or function for satisfying a digital data requirement of a data policy for a computing environment. An example of a control is a procedure or practice for storing, redacting, encrypting, transferring, or otherwise handling a specific data type in a computing environment that entities are required to follow in connection with a regulation governing security or privacy. For instance, a control can include requirements for handling personally identifiable information, financial information, medical information, legal information, or other data types in computing devices or transmissions between computing devices.

Furthermore, in one or more aspects, a control action includes an action to install a particular control for handling specific data types. To illustrate, control actions can include actions for redacting specific data types from digital content items, encrypting specific data types, grouping specific data types, excluding specific data types from communications, etc. Control actions can also include actions for modifying environments associated with digital content items, including implementing specific database operations for computing devices that handle data types, monitoring physical environments, installing environmental protections, restricting or reviewing access authorization to physical data centers, installing physical security controls, implementing specific security or privacy rules within an organization, etc.

Figure 2:
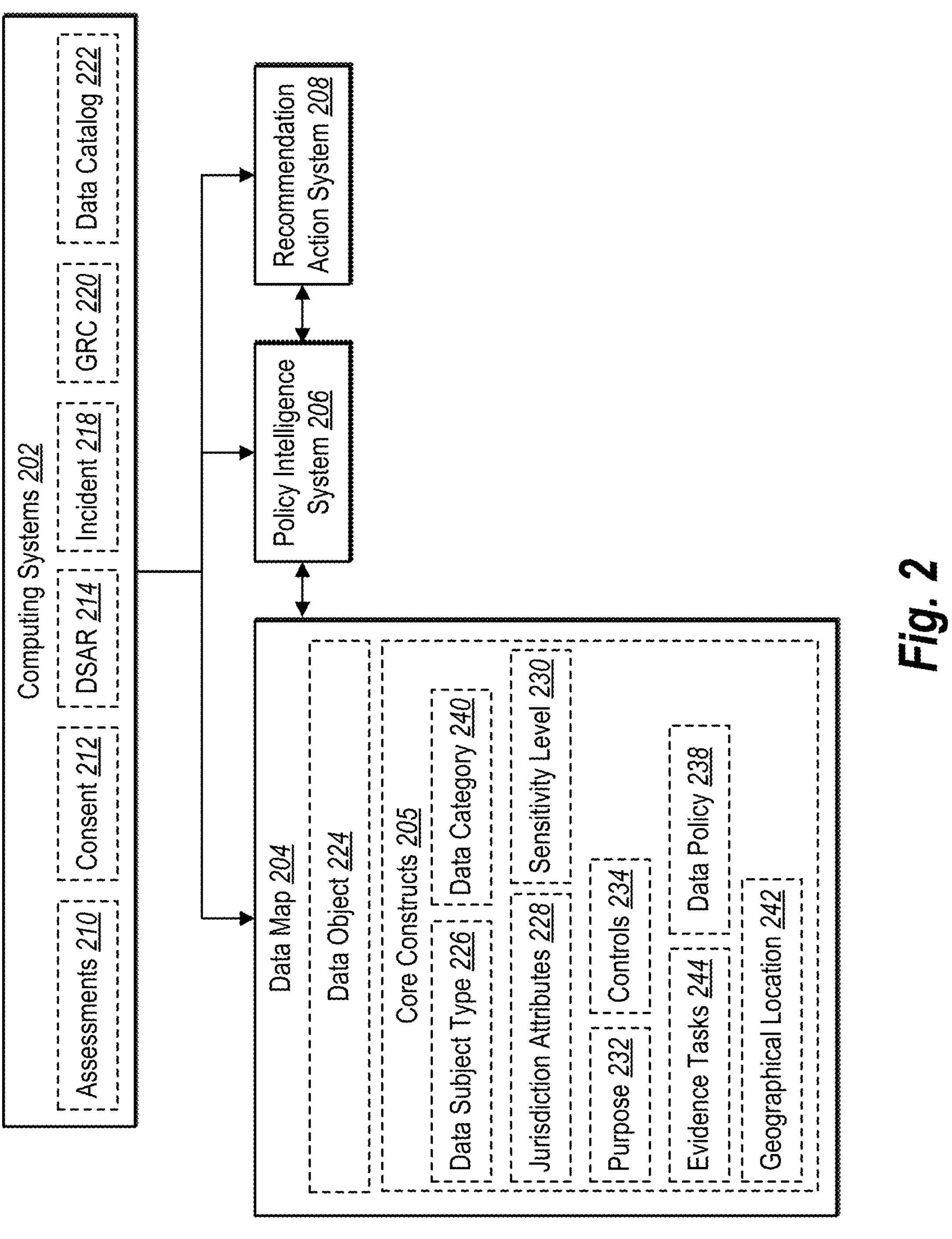
FIG. 2 illustrates an example of the policy implementation system providing recommended actions in relation to data objects for a plurality of different computing components in accordance with one or more aspects.

Additionally, as used herein, the term "data process" refers to a computing process that performs one or more actions associated with specified data. In some aspects, a data process is represented by a data object (e.g., a data process object). For example, the Policy implementation system 100 generates/stores a data object representing a data process including, but not limited to, a computing process or action corresponding to execution of processing instructions (e.g., by utilizing a database operation) to process, collect, access, store, retrieve, modify, or delete target data. To illustrate, for target data including credit card information and payment information associated with processing a credit card transaction, the policy implementation system 100 generates a data object to represent a data process that collects the credit card information through a form (e.g., webpage) provided via the website and processes the credit card information with the appropriate card provider to process the credit card transaction. In additional examples, data processes include processes for transmitting data between servers and client devices, storing data in databases, encrypting data, or periodically cleaning up stored data in databases, As illustrated in FIG. 2, the policy implementation system 100 can interface with a variety of computing systems 202 including a plurality of sources communicating with the policy implementation system 100 for handling operations of an entity (e.g., sources including software applications or other computing operations to provide data to or retrieve data from the policy implementation system 100). To illustrate, the policy implementation system 100 interfaces or otherwise communicates with the computing systems 202 in connection with managing compliance with various data policies. In various embodiments, the computing systems 202 include sources from a variety of computing systems related to, but not limited to, assessments 210, consent 212, data subject access requests ("DSAR") 214, incidents 218, governance, risk, and compliance ("GRC") 220, and/or a data catalog 222. In particular, the sources can include different computing systems communicating with the policy implementation system 100 through integration with a policy intelligence system 206 and a recommendation action system 208.

For example, the policy implementation system 100 can manage data associated with assessments 210, such as risk assessments. Specifically, the assessments 210 can be privacy impact assessments (e.g., assessments that identify risks to individuals' privacy caused by the processing of personal data), data protection impact assessments (e.g., assessments that evaluate risks arising from high-risk data processing activities), vendor risk assessments (e.g., assessments that evaluate vendor data security practices, vendor compliance with privacy laws, and potential exposure to cyber threats), security risk assessments (e.g., assessments that focus on identifying and mitigating cybersecurity risks within an organization's information systems), compliance risk assessments (e.g., assessments that evaluate compliance with various data protection regulations, such as the GDPR, CCPA, HIPAA among others), ethics and compliance risk assessments (e.g., assessments that evaluate risks related to ethical conduct and internal policies, such as in the context of global business operations), and/or environmental, social, and governance risk assessments (e.g., assessments that evaluate exposure to ESG risks), among others.

Additionally, as shown, the policy implementation system 100 can manage consent data for data processing activities (e.g., in relation to consent 212 in FIG. 2). For example, the policy implementation system 100 can determine data received in connection with obtaining consent for data processing activities, granular consent, cookie consent, among others.

Moreover, the policy implementation system 100 can manage data associated with data subject access requests (e.g., in relation to DSAR 214 in FIG. 2). For example, the data subject access requests can include requests for an entity to provide a data subject with data relating to the data subject collected and/or otherwise stored by the entity. The policy implementation system 100 can obtain data associated with DSARs and/or manage compliance of DSARs with various data policies.

Further, the policy implementation system 100 can manage data in connection with various incidents related to various computing systems (e.g., in relation to incident 218 in FIG. 2). For example, the policy implementation system 100 can determine data in connection with reports of data breaches of an entity and/or manage various controls to prevent or correct data breaches.

Additionally, the policy implementation system 100 can manage data associated with one or more governance, risk, and compliance frameworks (e.g., in relation to GRC 220 in FIG. 2). For example, the policy implementation system 100 can manage governance policies from entities that define how an entity uses software or hardware in connection with policies for data handling, privacy, and security. Further, the policy implementation system 100 can manage requests for risk assessments, such as vendor risk assessments, as well as regulatory compliance frameworks (e.g., GDPR, CCPA, HIPAA, among others).

Moreover, the policy implementation system 100 can manage a data catalog 222 for an entity, including determining how and what data is included in the data catalog 222 or using the data catalog 222 in connection with managing one or more other computing systems. For example, the policy implementation system 100 can access the data catalog 222 and determine that the data catalog 222 includes information pertaining to the sources, types, ownership, schema, classification, and quality of data accessed, stored, and/or otherwise used by the entity.

Indeed, as shown in FIG. 2, the policy implementation system 100 determines a data map 204 for use in managing data associated with the computing systems 202. Specifically, in one or more embodiments, the data map 204 includes a digital representation of digital assets, digital data, and digital processing activities associated with an entity and relationships between the digital assets, digital data, and digital processing activities. In one or more embodiments, the data map 204 includes a graph-based taxonomy with stored digital files representing the various elements and relationships between the elements. Additionally, in one or more embodiments, the policy implementation system 100 can determine core constructs 205 associated with important/relevant data objects and attributes from the data map 204 (e.g., indicating data objects that may be impacted by various data policies). In one or more embodiments, the policy implementation system 100 determines the core constructs 205 by quantifying and/or otherwise classifying data from or associated with the entity (e.g., based on the computing systems 202) to determine universal elements that are standardized across various computing systems and/or for a plurality of entities.

As illustrated, the policy implementation system 100 can determine the data map 204 from various core constructs 205. For example, the policy implementation system 100 can determine a data object 224 from the computing systems 202 or from computing devices associated with an entity. The data object 224 can be an aspect of data relating to a data subject, digital asset, data processing activity, etc., associated with the entity. Moreover, the policy implementation system 100 can determine a data category 240 corresponding to the data object 224. Indeed, the policy implementation system 100 can use the data category 240 to group related data objects. For example the policy implementation system 100 can determine that the data object 224 is 123-456-7890. The policy implementation system 100 can determine that the data category 240 of the data object 224 is "phone number."

As shown, the policy implementation system 100 can determine a data subject type 226 corresponding to the data object 224. Indeed, the data subject type 226 can identify a category corresponding a data subject of the data object 224. For example, the data subject type 226 can be "employee," "customer," "contractor," or "patient," among others.

As illustrated, the policy implementation system 100 can determine jurisdiction attributes 228 relating to the data object 224. Specifically, the jurisdiction attributes 228 can indicate a legal jurisdiction that determines the applicability of specific laws to the data object 224. In some embodiments, the policy implementation system 100 can determine the jurisdiction attributes 228 according to a geographical location 242 of the data subject related to the data object 224. In some embodiments, the policy implementation system 100 can determine the jurisdiction attributes 228 according to a geographical location 242 where the data object 224 is stored (e.g., a geographic location of a server that hosts the data object 224). Moreover, the policy implementation system 100 can determine a data policy 238 for the data object 224. Indeed, the data policy 238 can include digital data requirements corresponding to the data object 224. In some embodiments, the policy implementation system 100 can determine the data policy 238 according to or otherwise in conjunction with the jurisdiction attributes 228.

Indeed, as shown, the policy implementation system 100 can determine a sensitivity level 230 of the data object 224. In some embodiments, the policy implementation system 100 can determine the sensitivity level 230 according to the data category 240 corresponding to the data object 224. For example, the policy implementation system 100 can determine that a first data object has a first data category of "Social Security Number" and that a second data object has a second data category of "Email Address." The policy implementation system 100 can determine a first sensitivity level of the first data object according to the first data category and a second sensitivity level of the second data object according to the second data category. The policy implementation system 100 can determine that the first sensitivity level is higher compared to the second sensitivity level.

Moreover, in some embodiments, the policy implementation system 100 can determine the sensitivity level 230 according to the data subject type 226 corresponding to the data object 224. For example, the policy implementation system 100 can determine that a first data subject type corresponding a first data object is "employee" and that a second data subject type corresponding to a second data object is "patient." The policy implementation system 100 can determine a first sensitivity level corresponding to the first data object according to the first data subject type and a second sensitivity level corresponding to the second data object according to the second data subject type.

As illustrated, the policy implementation system 100 can determine a purpose 232 related to the data object 224. Specifically, the policy implementation system 100 can determine the purpose 232 for collecting and/or otherwise processing the data object 224.

Additionally, the policy implementation system 100 can determine controls 234 relating to the data object. Indeed, the policy implementation system 100 can utilize the controls 234 to satisfy digital data requirements for performing operations involving a digital asset, digital data, or digital processing activity represented by the data object 224 (e.g., via various limitations or restrictions on transmitting or storing data). Further, the policy implementation system 100 can determine the controls 234 according to the data policy 238. Moreover, the policy implementation system 100 can determine evidence tasks 244 relating to the data object 224. Specifically, the policy implementation system 100 can determine the evidence tasks 244 to demonstrate implementation of the controls 234 relating to the data object 224.

Indeed, as illustrated, the policy implementation system 100 can determine the data map 204 including or otherwise linking the core constructs 205 to data objects in the data map 204. Indeed, in some embodiments, the core constructs 205 can be data attributes of the data object 224. By determining the core constructs 205 and relationships between the core constructs 205 in relation to the data objects of the data map 204, the policy implementation system 100 can provide standardized, uniform recommendation actions for data processing utilizing a policy intelligence system 206 and a recommendation action system 208. More information regarding determining the data map 204 is provided below with regard to FIG. 8. More information regarding the policy intelligence system 206 is provided below with regard to FIG. 3. More information regarding the recommendation action system 208 is provided below with regard to FIG. 4.

Figure 3:
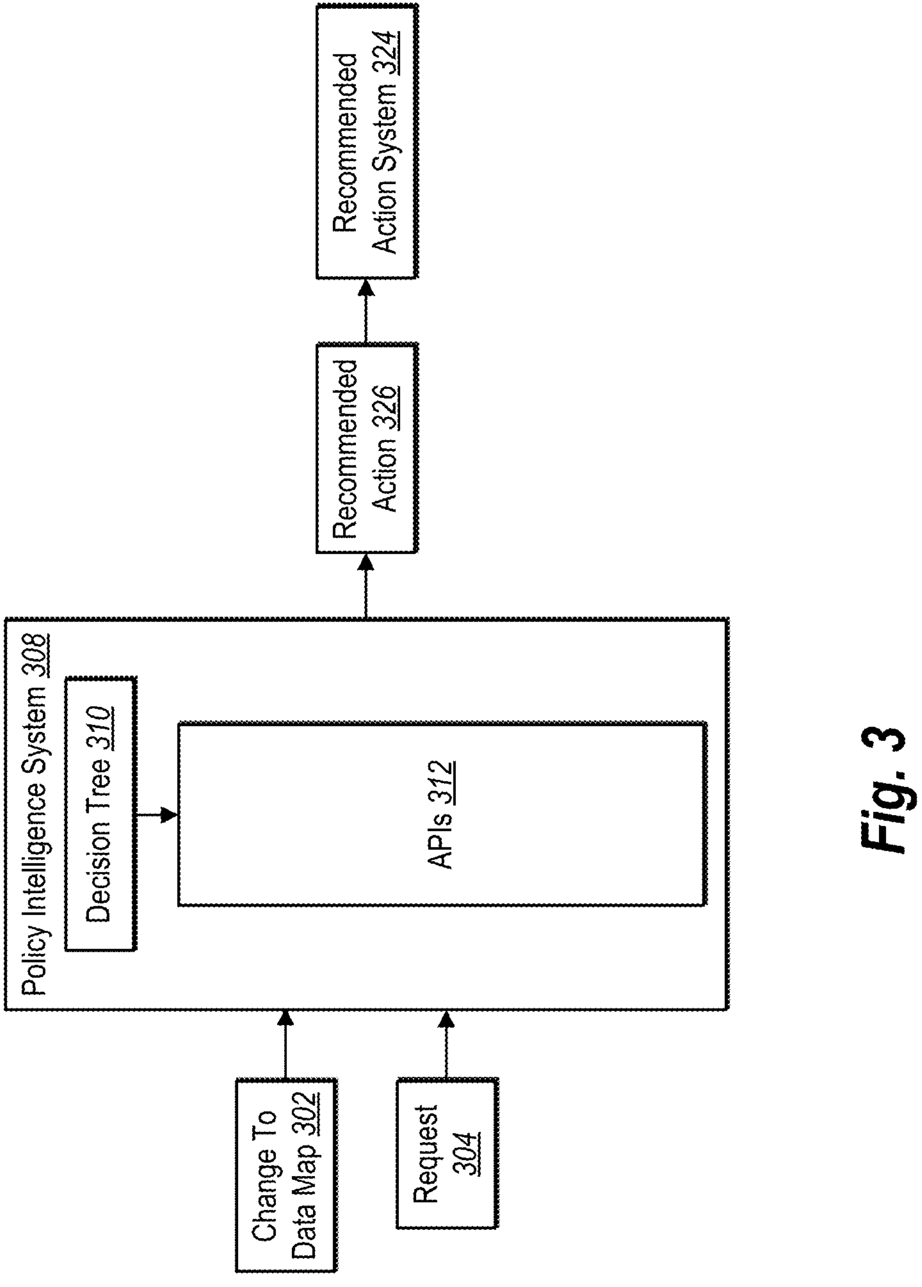
FIG. 3 illustrates an example of the policy implementation system utilizing a decision tree to generate a recommended action responsive to a request or detecting changes in a data map in accordance with one or more aspects.

As shown in FIG. 3, the policy implementation system 100 monitors the data map 302, the sources of the data map (e.g., the computing systems 202 of FIG. 2), and/or one or more other maps (e.g., a regulatory map corresponding to one or more data policies) to determine a change in the data map 302. Specifically, the policy implementation system 100 can determine a change in a core construct related to one or more data objects of the data map 302 (e.g., a core construct of the core constructs 205 of the data object 224 of the data map 204 of FIG. 2). For example, the policy implementation system 100 can determine a change of a purpose for collecting the data object (e.g., the policy implementation system 100 can determine that an entity changed its purpose for collecting data from data subjects). In another example, the policy implementation system 100 can detect a change to a data object based on a change to the digital asset, digital data, or data processing activity represented by the data object. In further examples, the policy implementation system 100 can detect the change to the data map 302 in response to a creation of a data object or a deletion of a data object. Responsive to detecting the change to the data map 302, the policy implementation system 100 can utilize a policy intelligence system 308 to determine a recommended action 326 for modifying digital assets, digital data stored on the digital assets, or data processing activities involving one or more digital assets and/or digital data.

The policy implementation system 100 can generate and/or otherwise determine the decision tree 310 utilizing the data policy 238 determined in FIG. 2. Additionally, the policy implementation system 100 can iteratively add to or otherwise expand the decision tree 310 according to multiple data policies. For example, the policy implementation system 100 can determine multiple data policies (e.g., the policy implementation system 100 can determine a plurality of data policies from a plurality of geographical locations and/or jurisdictions) and generate the decision tree 310 according to the multiple data policies. The decision tree 310 can include nodes that represent various aspects of core constructs and relationships between the core constructs based on requirements of the data policy (or data policies). In additional embodiments, the policy implementation system 100 generates separate decision trees for different data policies (e.g., such that each data policy has its own decision tree) according to a regulatory map indicating the various digital data requirements of the data policies. More information regarding and traversing the decision tree 310 is provided below with regard to FIG. 5.

Specifically, the policy implementation system 100 can execute one or more application programming interface (APIs 312) calls. Indeed, the policy implementation system 100 can determine which of the APIs to call according to the change to the data map 302 and traversal of the decision tree 310. For example, the APIs 312 can include an API for determining digital data requirements corresponding to a particular data policy in connection with the change to the data map 302. Additionally, the APIs 312 can include one or more APIs for determining which actions to take for one or more computing systems communicating with the policy intelligence system 308 (e.g., as illustrated in FIG. 2). To illustrate, the APIs 312 can include an API to determine whether and/or how to take one or more actions related to incidents (e.g., data breaches). Additionally, the APIs 312 can include an API to determine how to ensure DSARs are compliant with the data policies. In additional examples, the APIs 312 can include an API to determine sensitivity information of a particular data object and/or how a sensitivity level of the data object is impacted by a change to the data object. Although not exhaustively described herein, the policy implementation system 100 can include any number of additional APIs for performing operations related to managing compliance of digital assets, digital data, and/or data processing activities of an entity in connection with various data policies.

Further, in some embodiments, the APIs 312 can include a control API for determining one or more controls related to one or more data objects based on the change to the data map 302. For example, the policy implementation system 100 can utilize the APIs 312 to determine a current implementation of one or more controls and/or required controls for one or more data objects in view of one or more data policies. Furthermore, as illustrated in FIG. 3, the policy implementation system 100 can utilize the policy intelligence system 308 (e.g., the decision tree 310 with the APIs 312). For instance, Moreover, in some embodiments, the policy implementation system 100 executes the one or more APIs 312 to traverse the decision tree 310. to generate a recommended action 326 in response to generating the data map, detecting the change to the data map 302, or receiving a request 304 to evaluate the data map 302 and/or one or more data policies. Indeed, the recommended action 326 can be one or more of the outputs of the APIs 312 in connection with traversing the decision tree 310. For example, the recommended action 326 can include an action to implement or modify a control measure based on a sensitivity level of one or more data objects used by a processing activity involving the data object(s). In additional examples, the policy implementation system 100 can generate the recommended action 326 to modify a digital asset represented by a data object, digital data stored on the digital asset, or data processing activities involving the digital assets. After generating the recommended action 326, the policy implementation system 100 can cause the policy intelligence system 308 to provide the recommended action 326 to the recommended action system 324. In one or more embodiments, the policy implementation system 100 utilizes a single API call to a single API to perform a plurality of actions (e.g., to traverse the decision tree 310 and generate the recommended action 326), rather than a plurality of separate API calls to a plurality of separate APIs.

Figure 4:
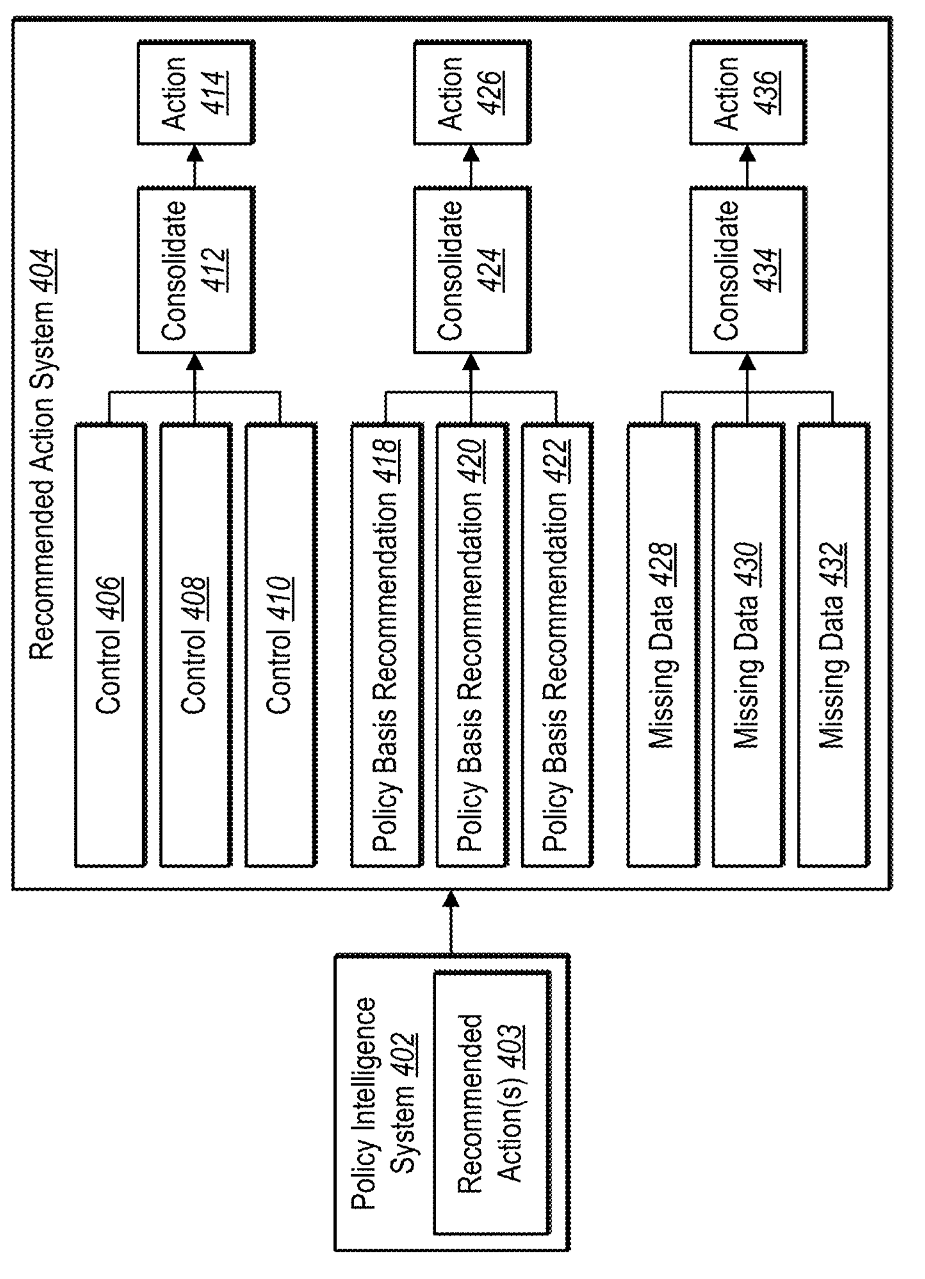
FIG. 4 illustrates an example of the policy implementation system consolidating data processes and recommending actions for the consolidated data processes in accordance with one or more aspects.

As illustrated in FIG. 4, the policy implementation system 100 can utilize a recommended action system 404 (e.g., the recommended action system 324 of FIG. 3) to determine recommended action(s) 403 (e.g., the recommended action 326 of FIG. 3) via traversal of a decision tree by a policy intelligence system 402 (e.g., the policy intelligence system 308 of FIG. 3). Additionally, in one or more embodiments as shown, the recommended action system 404 can determine types of the recommended action(s) 403 and consolidate the recommended action(s) 403 according to the types. After consolidating the recommended actions, the policy implementation system 100 can provide and/or perform an action.

For example, as shown, the policy implementation system 100 can determine a first recommended action, a second recommended action, and a third recommended action of a first type. The policy implementation system 100 determines that the first recommended action is a control 406, the second recommended action is a control 408, and the third recommended action is a control 410, such that the types of the different recommended actions are the same. Responsive to determining that the first, second, and third recommended actions have the same type, the policy implementation system 100 can cause the recommended action system 404 to perform an act 412 to consolidate the first, second, and third recommended actions into a consolidated action 414. By consolidating the recommended actions into a single recommended action that encompasses control 406, control 408, and control 410, the policy implementation system 100 can simplify the recommended action while also potentially saving on computing resources and control implementation efficiency.

Further, as illustrated, the policy implementation system 100 can determine a fourth, fifth, and sixth recommended action. The policy implementation system 100 can determine a type for the fourth, fifth, and sixth recommended actions and determine that each of them are a policy basis recommendation (e.g., a policy basis recommendation 418, a policy basis recommendation 420, and a policy basis recommendation 422). Responsive to determining the types of the fourth, fifth, and sixth recommendation actions (e.g., responsive to determining a plurality of recommended actions of the same type), the policy implementation system 100 can cause the recommended action system 404 to perform an act 424 to consolidate the fourth, fifth, and sixth recommended actions into a consolidated action 426.

Further, as illustrated, the policy implementation system 100 can determine a seventh, eighth, and ninth recommended action. The policy implementation system 100 can determine that the types of each of the seventh, eighth, and ninth recommended actions are missing data (e.g., missing data 428, missing data 430, and missing data 432). Responsive to determining the types of the seventh, eighth, and ninth recommended actions, the policy implementation system 100 can perform an act 434 to consolidate the seventh, eighth, and ninth recommended actions into a consolidated action 436.

As an example, for an entity with digital assets that are all missing "data subject type" information as determined using a data map and a decision tree, the policy implementation system 100 determines that this constitutes a compliance gap for each of the assets, resulting in ten separate recommendations. The policy implementation system 100 can use the consolidation operations to consolidate all of the separate recommendations into a single recommended action within a graphical user interface (e.g., within a dashboard) and link the recommended action to the separate digital assets. The policy implementation system 100 thus provides a consolidated graphical user interface that eliminates the need for the user to navigate within the graphical user interface to each of the different assets and manually update the missing information by consolidating the recommended actions and linking the different digital assets to a single recommended action.

Indeed, regarding the discussion above, the use of the terms first, second, third, fourth, fifth, sixth, seventh, eighth, and ninth are not intended to define a rigid sequential order, but rather to differentiate among different recommended action(s) 403 the policy implementation system 100 uses the recommended action system 404 to generate. Indeed, the policy implementation system 100 can cause the recommended action system 404 to generate recommended action(s) 403 of one or more types based on traversal of one or more decision trees in connection with detecting changes to a data map and/or changes to a regulatory map. The policy implementation system 100 can determine a type of each of the recommended action(s) 403 and consolidate the recommended action(s) 403 according to their type as may serve various embodiments. Indeed, by consolidating multiple recommended actions of a similar type into a single actionable task, the policy implementation system 100 improves the efficiency of implementing systems by avoiding repetitive task performance. In alternative embodiments, the policy implementation system 100 can choose not to consolidate recommended actions of the same type in response to various criteria, such as preferences, priority levels of recommended actions, or other information.

In one or more embodiments, in connection with generating the recommended action(s) 403, the policy implementation system 100 performs one or more operations to implement the recommended action(s) 403. For example, the policy implementation system 100 can communicate with a computing device (or computing devices) to implement one or more control measures (e.g., to encrypt one or more data types). In another example, the policy implementation system 100 can communicate with a computing device to delete a certain data type found to be in violation of a data policy. In another example, the policy implementation system 100 can generate a notification to present for display within a graphical user interface requesting certain information that is found to be missing.

Figure 5:
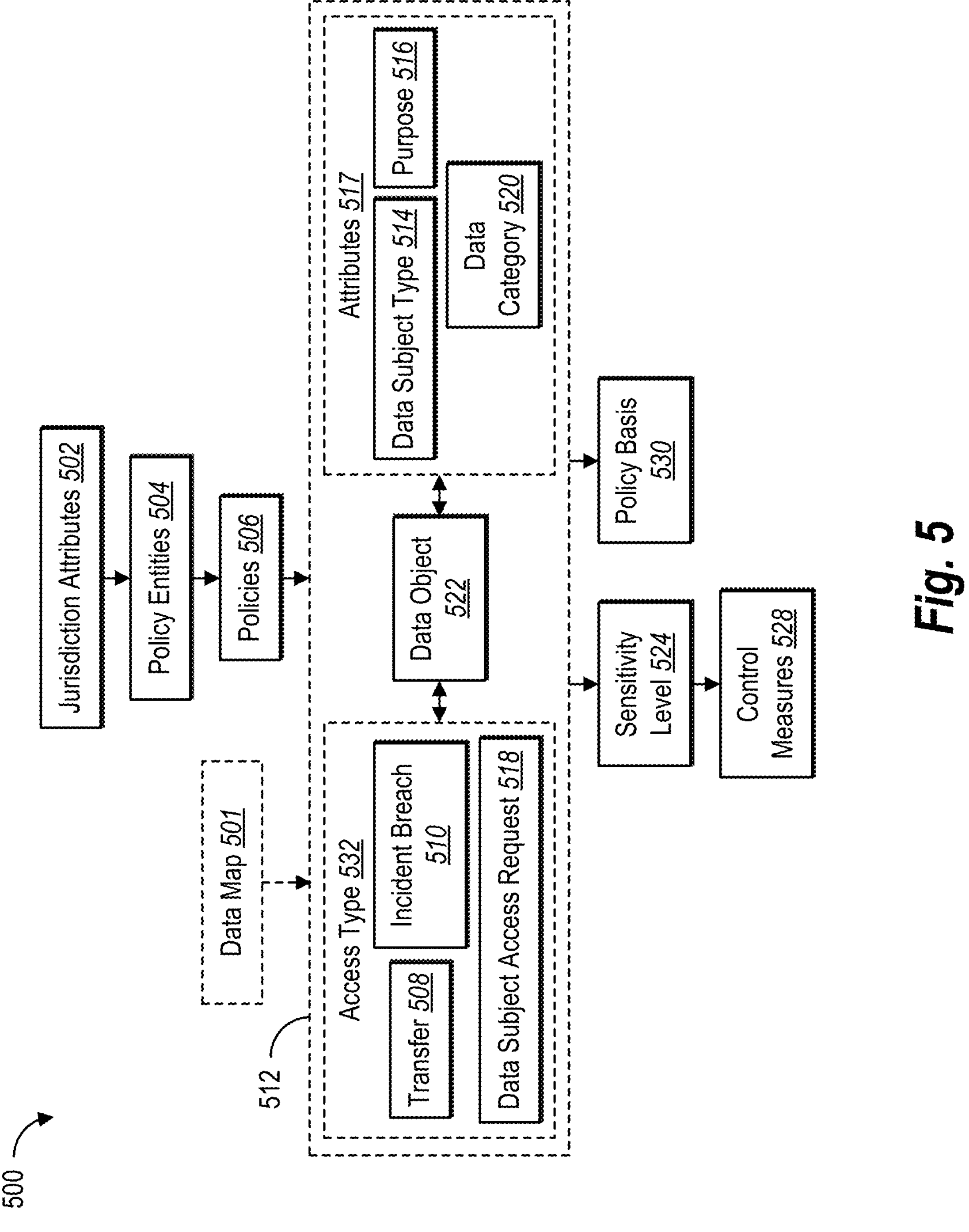
FIG. 5 illustrates an example of the policy implementation system navigating a decision tree in accordance with one or more aspects.

As previously mentioned, responsive the policy implementation system 100 can generate and traverse a decision tree for providing recommended actions to address compliance gaps based on changes to a data map and/or applicable data policies. FIG. 5 illustrates the policy implementation system 100 generating a decision tree 500 and traversing the decision tree 500 to determine one or more recommended actions in relation to a data map 501 and including one or more data objects (e.g., data object 522). The policy implementation system 100 can generate or otherwise determine the data map 501, as previously described. In one or more embodiments, the policy implementation system 100 generates the data map 501 using one or more data discovery processes, as described in more detail below with regard to FIG. 8. Further, as previously discussed, the policy implementation system 100 can determine a change to the data map 501, such as in response to a change to a digital asset, digital data stored on one or more digital assets, or data processing activities involving one or more digital assets, any of which can be represented by the data object 522. In additional embodiments, the policy implementation system 100 can detect a change to a data policy applicable to the data object 522. Although FIG. 5 illustrates a specific decision tree 500 structure of nodes, in other embodiments, a decision tree includes a different structure of nodes with different content in the nodes and relationships between the nodes.

In response to determining that a particular data policy is applicable to a detected change in the data map 501 (e.g., based on a change to the data object 522) and/or to the data policy itself, the policy implementation system 100 can traverse nodes of the decision tree 500 (e.g., via one or more API calls as previously described) to determine an applicable data policy and various attributes of one or more data objects to which the data policy applies (e.g., data object 522). In one or more embodiments, nodes of the decision tree 500 can represent details of one or more data policies, the data object 522, and various recommended actions to provide. To illustrate, the policy implementation system 100 determines jurisdiction attributes 502 and policy entities 504 for determining policies 506 (e.g., one or more data policies) that indicate the structure of the decision tree 500 and the applicability of the policies 506 to the data map 501. In one or more embodiments, the jurisdiction attributes 502 include a geographical storage location of data, a geographical location where a data processing activity occurs, or a geographical location of a digital asset, among others.

As illustrated, the policy implementation system 100 can utilize the jurisdiction attributes 502 of the data object to determine policy entities 504. The policy entities 504 can be entities responsible for creating or enforcing data policies that dictate or otherwise govern how the data object 522 or other data within the data map 501 is handled. For example, the policy entities 504 can be governments or other governing or regulatory bodies, such as local, federal, or international governing bodies or regulatory bodies over a particular industry. Indeed, the policy implementation system 100 can determine that different policy entities 504 govern different aspects of the data map 501.

Additionally, as shown, responsive to determining the policy entities 504, the policy implementation system 100 can determine policies 506 (i.e., one or more data policies) of the policy entities 504. Specifically, in addition to the policy implementation system 100 determining portions of the data map 501 that are governed by one or more policy entities 504, the policy implementation system 100 can determine one or more policies 506 one or more policy entities. Accordingly, the policy implementation system 100 can determine that different portions of the data map 501 can be governed by a single policy entity, but by differing policies of the policy entity. In this manner, the policy implementation system 100 utilizes the decision tree 500 as a centralized hub for determining which policy entities 504 govern portions of the data map and which policies are applicable to data objects of the data map.

Responsive to determining the policy entities 504 and policies 506 that govern portions of the data map 501, the policy implementation system 100 can determine context 512 for a data object 522 of the data map 501 (e.g., the data object that the policy implementation system 100 determined according to the change in the data map 501). Specifically, the context 512 indicates specific attributes or types of data elements represented by data objects in the data map 501 for use in determining how to traverse the decision tree 500. For instance, in response to determining the policies 506 applicable to the data map 501, the policy implementation system 100 determines how to traverse the decision tree 500 to determine one or more actions according to the context 512.

As shown, in one or more embodiments, the context 512 for the data object 522 includes attributes 517 of the data object 522 (e.g., nodes of the decision tree 500 that represent attributes 517 of the data object 522). For example, the policy implementation system 100 can determine the attributes 517 of the data object by determining a data category 520 (e.g., the data category 240 of FIG. 2) of the data object 522, a data subject type 514 (e.g., the data subject type 226 of FIG. 2) of the data object 522, and/or a purpose 516 (e.g., the purpose 232 of FIG. 2), for the collection, storage, and/or processing the data object 522. In various embodiments, the policy implementation system 100 determines some or all of the attributes 517 of the data object 522 depending on the information available, the detected change to the data map 501, and/or other implementation details for traversing the decision tree 500.

In one or more embodiments, as part of determining the context 512, the policy implementation system 100 can determine an access type 532 (e.g., nodes of the decision tree 500 that represent an access type 532). For example, the policy implementation system 100 can determine that the access type is a data subject access request 518 (e.g., the request 304 of FIG. 3) for data represented by the data object 522. Additionally or alternatively, the policy implementation system 100 can determine that the access type is a transfer 508. For example, the policy implementation system 100 can determine that a data element represented by the data object 522 is transferred from a first geographical location to a second geographical location. Additionally or alternatively, the policy implementation system 100 can determine that ownership of the data element represented by the data object 522 is transferring from a first entity to a second entity. Indeed, responsive to detecting a transfer 508, the policy implementation system 100 can utilize the data map to determine new jurisdiction attributes 502, policy entities 504, or policies 506 that are applicable to the data object. Additionally, the policy implementation system 100 can determine that the access type 532 is an incident breach 510 such as unauthorized access and/or processing of the a data element represented by the data object 522.

Indeed, as shown, the policy implementation system 100 can utilize the decision tree 500 to perform additional operations based on the attributes 517 and/or access type 532 determined by traversing the decision tree 500. For example, based on the previously traversed nodes of the decision tree 500, the policy implementation system can determine a sensitivity level 524 for the data object 522. Accordingly, the policy implementation system 100 can utilize an API to determine the sensitivity level 524, such as by executing one or more API calls based on the data object 522, the jurisdiction attributes 502, the policy entities 504, the policies 506, and the context 512 to determine the sensitivity level 524.

Additionally, as illustrated, based on determining the sensitivity level 524, the policy implementation system 100 can utilize the decision tree 500 to determine control measures 528 to implement according to the sensitivity level 524. For example, the policy implementation system 100 can execute a call to an API and provide the data object 522, the jurisdiction attributes 502, the policy entities 504, the policies 506, the context 512, and/or the sensitivity level 524 to the API to determine the control measures. To illustrate, the control measures 528 can include measures to implement in response to the change in the data map and/or based on the access type 532 based on the traversal of the decision tree 500.

Further, as shown, the policy implementation system 100 can utilize the decision tree 500 to determine a policy basis 530 relevant to the data object 522. Indeed, the policy implementation system 100 can provide the data object 522, the jurisdiction attributes 502, the jurisdiction attributes 502, the policy entities 504, the policies 506, and/or the context 512 to an API to determine the policy basis 530 (e.g., a legal basis) for collecting, storing, processing, or otherwise utilizing a data element represented by the data object 522.

In one or more embodiments, the policy implementation system 100 traverses the decision tree 500 a plurality of times in connection with detecting one or more changes to the data map 501 and/or to one or more data policies. For example, the policy implementation system 100 can traverse the decision tree 500 in a first traversal operation to determine the access type 532 in connection with the data object 522. After determining the access type 532, the policy implementation system 100 can traverse the decision tree 500 (or a portion of the decision tree 500) in a second traversal operation to determine the sensitivity level 524 and the control measures 528. Furthermore, the policy implementation system 100 can traverse the decision tree 500 (or a portion of the decision tree 500) in a third traversal operation to determine the policy basis 530. Alternatively, the policy implementation system 100 utilizes a single traversal operation to determine the access type 532, the control measures 528, and/or the policy basis 530, as serves a particular implementation. Additionally, the policy implementation system 100 can provide the sensitivity level 524, the control measures 528, and/or the policy basis 530 to a client device through a user interface.

Figure 6:
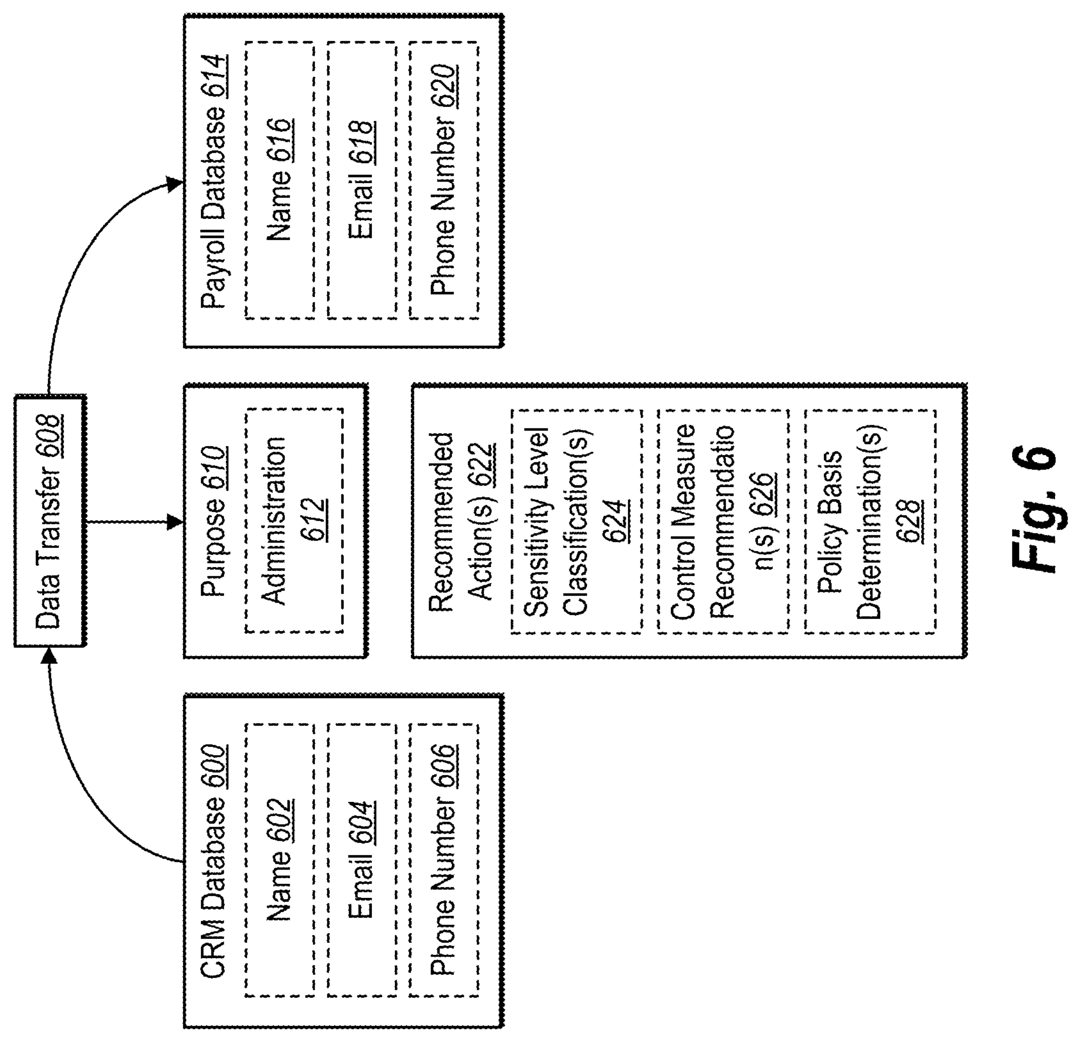
FIG. 6 illustrates an example of the policy implementation system performing a data transfer in accordance with one or more aspects.

FIG. 6 illustrates an example embodiment of the policy implementation system 100 utilizing a decision tree traversal process, as described above, to determine one or more recommended actions for a data transfer 608. Indeed, the policy implementation system 100 can determine that the data transfer 608 is occurring (or has occurred) by determining a change to one or more data objects in a data map. For example, the policy implementation system 100 can determine that an entity is transferring data from a customer relationship management ("CRM") database 600 to a payroll database 614.

Additionally, the policy implementation system 100 can determine data categories of data in the CRM database 600 and in the payroll database 614. To illustrate, the policy implementation system 100 can determine the data categories of data transferred from the CRM database 600 to the payroll database 614. Indeed, as shown, the policy implementation system 100 can determine that the data categories stored in the CRM database 600 are name 602, email 604, and phone number 606. Accordingly, the policy implementation system 100 can determine that the data categories stored in the payroll database 614 are name 616, email 618, and phone 620 (e.g., based on the data from the CRM database 600 being transferred to the payroll database 614).

As shown, according at least based on the data categories storied in the CRM database 600 and the payroll database 614, the policy implementation system 100 can determine (e.g., by traversing a decision tree) that the purpose 610 of the data transfer 608 is administration 612 (e.g., employee administration). Based on determining the purpose 610, the policy implementation system 100 can execute one or more API calls to determine recommended action(s) 622 for the data transfer 608. For example, the policy implementation system 100 determines a decision tree corresponding to the data transfer 608 based on one or more data policies related to the data categories, the purpose 610, details of the CRM database 600 and/or the payroll database 614, and/or other details of the data transfer 608. The recommended action(s) 622 can include actions related to sensitivity level classification(s) 624, actions for control measure recommendation(s) 626, and/or actions related to policy basis determination(s) 628.

Figure 7A:
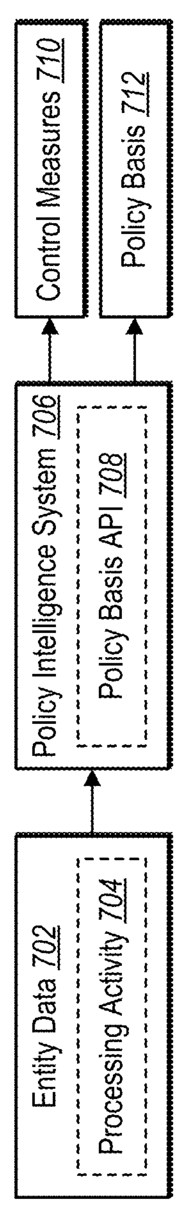
FIGS. 7A-7B illustrate examples of the policy implementation system determining control measures for entity data in connection with the data transfer of FIG. 6 in accordance with one or more aspects.
Figure 7B:
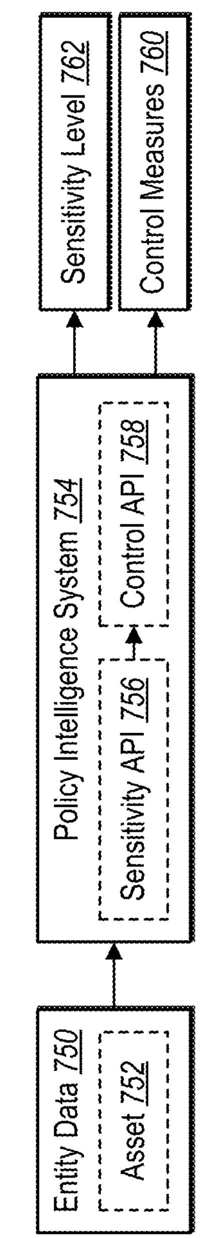

FIGS. 7A-7B illustrate examples of the policy implementation system 100 generating recommended actions according to entity data utilizing one or more example APIs for traversing one or more decision trees. Indeed, as shown in FIG. 7A, the policy implementation system 100 can determine a processing activity 704 performed by an entity by analyzing entity data 702. For example, the policy implementation system 100 can analyze the entity data 702 by generating or accessing a data map from the entity data 702. Based on determining the processing activity 704 (e.g., in response to detecting a creation or modification of the processing activity 704 via the data map), the policy implementation system 100 can utilize a policy intelligence system 706 (e.g., the policy intelligence system 308 of FIG. 3) to execute an API call to a policy basis API 708 (e.g., to traverse a decision tree). The policy implementation system 100 can utilize the policy basis API 708 to determine recommended actions, such as control measures 710 to implement for the processing activity 704 and a policy basis 712 for performing the processing activity.

As an example, the policy implementation system 100 utilizes the policy basis API 708 to retrieve a legal basis for the purpose of the processing activity. To illustrate, the policy implementation system 100 determines that the purpose is account management in the context of GDPR laws. Accordingly, the policy implementation system determines the control measures 710 include implementing HTTPS/SSL encryption and transport layer security according to the relevant legal bases indicated by the policy basis 712.

In another example, as shown in FIG. 7B, the policy implementation system 100 can determine an asset 752 utilized by an entity by analyzing entity data 750. For example, the policy implementation system 100 can analyze the entity data 750 by generating or accessing a data map from the entity data 750. Based on determining the asset 752 (e.g., in response to detecting an addition of the asset 752 to the data map or detecting a change to the asset 752 via the data map), the policy implementation system 100 can utilize a policy intelligence system 754 (e.g., the policy intelligence system 308 of FIG. 3) to determine to execute a call to a sensitivity API 756 for traversing a decision tree. The policy implementation system 100 can utilize the sensitivity API to 756 to determine a sensitivity level 762 of the asset 752. Further, the policy implementation system 100 can provide the sensitivity level 762 to a control API 758. Indeed, the policy implementation system 100 can cause the control API 758 to utilize the sensitivity level 762 of the asset 752 to determine control measures 760 to implement for the asset 752.

Figure 8:
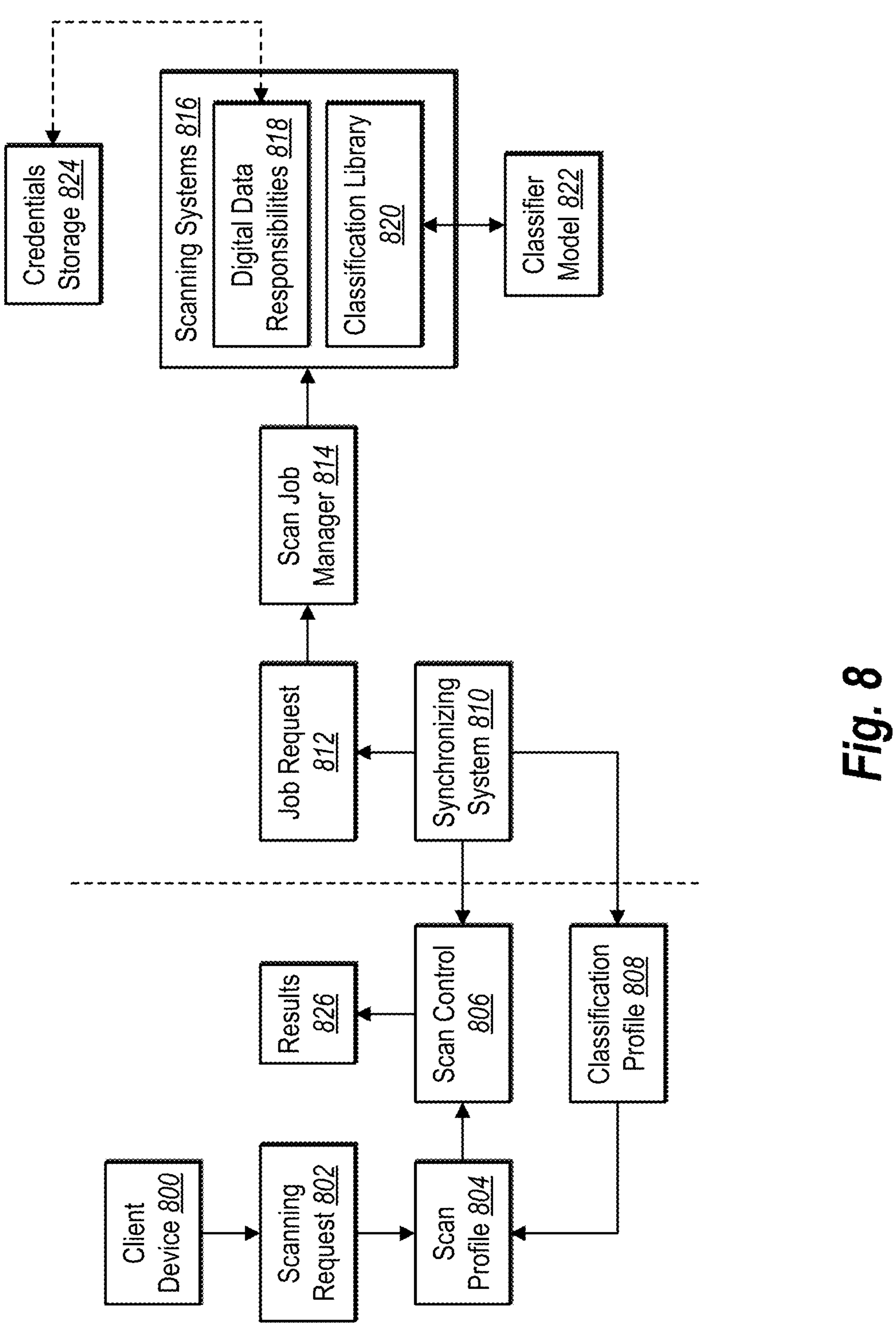
FIG. 8 illustrates an example of the policy implementation system scanning data in digital data repositories for generating a data map in accordance with one or more aspects.

FIG. 8 illustrates an example architecture of the policy implementation system 100 performing operations to generate a data map and detect missing data in, or changes to, stored data associated with an entity. In one or more aspects, as illustrated, a first portion of the policy implementation system 100 operates at a cloud-based computing system. Additionally, a second portion of the policy implementation system 100 operates on premises (e.g., on one or more computing devices or servers associated with an entity).

In one or more aspects, the policy implementation system 100 includes (or communicates with) a client device 800 that initiates a scanning request 802 to scan a dataset including a plurality of digital content items to generate a data map from the dataset. For example, the policy implementation system 100 can determine that the scanning request 802 indicates one or more instructions for scanning the dataset (e.g., based on a scan profile 804). To illustrate, the scan profile 804 indicates one or more data policies for analyzing a particular dataset, for example, as determined by a user indication of priority levels in a classification profile 808 or based on extracted priority levels corresponding to downstream operations. In connection with determining the scan profile 804 of the scanning request 802, the policy implementation system 100 provides the scan profile 804 to a scan control 806 that initiates the scanning request in connection with a portion of the Policy implementation system 100 at computing devices of the entity.

In one or more aspects, the policy implementation system 100 provides a packet or message sent including the scanning request 802 (with the scan profile 804) to a synchronizing system 810 (e.g., via an API provided by the policy implementation system 100) and including processing instructions to perform one or more operations via one or more recipient processors and/or processing threads. For instance, a scanning request can include a request to extract data, modify data, or otherwise perform operations on data for digital data.

To illustrate, the policy implementation system 100 utilizes the scan control 806 to provide processing instructions to perform one or more operations associated with the scanning request 802 via one or more recipient processors and/or processing threads at the computing devices of the entity. For instance, the synchronizing system 810 can continuously poll the scan control 806 for new job requests. In some aspects, the synchronizing system 810 provides the classification profile 808 for including with the scan profile 804. The policy implementation system 100 can deploy the synchronizing system 810 (with additional components) at the computing device(s) of the entity behind network security controls (e.g., outside one or more firewalls) for accessing digital content items associated with the entity (e.g., at the computing devices or via one or more remote computing devices through the firewall(s)). For instance, in the example depicted in FIG. 9, the synchronizing system 810 (with additional components) could be installed on the third-party computing system 908 in order to have access to one or more digital data repositories (e.g., the digital data repository 914) within a computing environment managed or accessed via one or more client devices 906. In this example, the policy implementation system 100 includes the scan control 806 and the synchronizing system 810. The scan control 806, installed on a server device(s) 904, can only communicate with the synchronizing system 810, installed on the third-party computing system 908, whereas the synchronizing system 810 (with additional components) can perform various scanning and classification actions described herein.

In one or more aspects, the policy implementation system 100 utilizes the synchronizing system 810 to compare a list of jobs included in a jobs table to determine one or more actions to take. For example, in response to determining that a scan job is present on the cloud-based system but not on the on-premises system, the synchronizing system 810 initiates a new job. In response to determining that a scan job is present on the on-premises system but not on the cloud-based system, the synchronizing system 810 cancels the job on the on-premises system. If the synchronizing system 810 determines that a scan job is present on both systems, the synchronizing system 810 determines a status of the scan job (e.g., completed, failed, or timed-out) and sends a status notification to the scan control 806.

In one or more aspects, the policy implementation system 100 utilizes the synchronizing system 810 to submit a job request 812 to a scan job manager 814 that manages the initiation and execution of scan jobs at the computing device(s) of the entity. For example, the policy implementation system 100 utilizes the scan job manager 814 to communicate with scanning systems 816 that scan digital data repositories 818 including a dataset associated with the job request 812. In additional aspects, the scanning systems 816 include functions, scripts, or applications integrated with the digital data repositories 818 to access and/or modify digital content items in the dataset. To illustrate, the scanning systems 816 communicate with a database management system, a cloud storage device or local storage devices, and/or storage accounts (e.g., utilizing credentials in a credentials storage 824) to access digital content items. In some embodiments, a listing of jobs received from the scan control 806 can include job contexts for each scan job, including a scan profile identifier, a base label version (e.g., version of label definitions for pre-seeded labels available to all clients), and a custom label version (e.g., version of label definitions for custom labels specific to the entity).

In one or more embodiments, the policy implementation system 100 executes a scan job through a pipeline of initiation, distribution, extraction and classification implemented by the scanning systems 816 on the on-premises system, in which various events are emitted at different stages. Events can include examples such as those in the table below.

| |
|---|
| JOB_DISTRIBUTION_STARTED |
| JOB_CANCELLED |
| INCREMENT_JOB_SIZE |
| JOB_DISTRIBUTION_COMPLETED |
| JOB_DISTRIBUTION_FAILED |
| TASK_STARTED |
| UPDATE_TASK_SIZE |
| INCREMENT_PROCESSED_SIZE |
| TASK_COMPLETED |
| TASK_FAILED |
| TASK_CANCELLED |

The scan job manager 814 can subscribe to the events and manage the lifecycle of the jobs/tasks based on those events. Additionally, scanning systems 816 can emit events upon completion of a particular phase of the scan job in a pipeline. In some aspects, the scan job manager 814 updates a jobs repository to indicate which of these events have been emitted for a given scan job.

Furthermore, as illustrated, the scanning systems 816 include a classification library 820 that communicates with a classification model 822 (e.g., a named entity recognition model or other natural language processing model) to determine classifications associated with the digital content items. In one or more aspects, the classification library 820 also communicates with the scan job manager 814 to obtain label definitions for labeling digital content items based on classifications generated by the classification model 822. Additionally, the classification library 820 can determine the label definitions according to information from the classification profile 808 and/or the scan profile 804.

In one or more embodiments, in a scan job, a portion of the policy implementation system 100 implemented on-premises can apply one or more of the classifiers to batches of test data extracted by the scanning systems 816. For example, the batch sizes can be based on a predefined batch size or a user-defined batch size. To illustrate, a configuration setting in the scan profile 804 can indicate a specific number to sample and classify before initiating sampling and/or classification of additional rows.

According to one or more aspects, in response to executing the job request 812 utilizing the scanning systems 816, the policy implementation system 100 utilizes the scanning systems 816 to communicate results data to the synchronizing system 810. For example the scanning systems 816 can provide a catalog and classification results corresponding to the digital content items indicated in the job request 812 to the synchronizing system 810. The policy implementation system 100 can utilize the catalog and classification results corresponding to the digital content items to generate, modify, or detect changes to a data map. Additionally, as illustrated, the synchronizing system 810 can provide the catalog and classification results to the scan control 806, which provides results 826 (e.g., including recommended actions) for display and analysis via one or more client devices (e.g., the client device 800). Additionally, the policy implementation system 100 can utilize the results 826 to generate, modify, or detect changes to a data map. Further, in one or more aspects, the policy implementation system 100 detects digital data, digital assets, and data processing activities at the computing devices of the entity (e.g., at the scan job manager 814) or at the cloud-based computing device (e.g., at the scan control 806).

In one or more embodiments, the policy implementation system 100 provides the results 826 in connection with one or more downstream operations. The downstream operations can involve one or more computing devices (e.g., the client device 800 or another device/system) performing operations to locate specific data types within the digital data repositories 818, manage data from the digital data repositories 818 via automated workflows, control access to data within the digital data repositories 818, and/or facilitate deletion of data from the digital data repositories 818. To illustrate, the policy implementation system 100 can detect a new type of data (e.g., personal data or sensitive data) stored in a particular data source, which triggers an automated workflow via a software platform that includes or has access to the digital data repositories 818. The automated workflow can include a series of user interfaces that are dynamically selected, generated, organized, or otherwise configured based on the subject matter of the workflow.

An example of the workflow includes a guided assessment (e.g., via one or more software modules of the platform) in which a series of user interfaces for collecting information (e.g., information regarding one or more of the data source, the discovered data, the use of the discovered data, etc.) are displayed to a user. The policy implementation system 100 (or another system) can dynamically select, configure, and organize the series of interfaces based on the subject matter of the assessment (e.g., selecting interfaces presenting questions related to assessing privacy issues for certain discovered data types) and the data received via various interfaces in the workflow (e.g., skipping a question that is deemed no longer relevant based on an answer to an earlier question by omitting an interface that would present the irrelevant question).

In one or more aspects, the policy implementation system 100 (or another system) can utilize a guided assessment to determine a sensitivity of a newly discovered data type, identify risks associated with the new data type, or develop a plan to manage risks associated with the new data type. Furthermore, the system may utilize the automated workflow to notify appropriate users of the new data type, implement appropriate security controls to protect the new data type, or monitor the new data type for potential security/privacy risks. Accordingly, the policy implementation system 100 can execute an assessment in response to one or more user inputs or automatically in response to detecting a data type in a particular source and execute an automated workflow to perform one or more computing operations based on the assessment and/or otherwise in connection with detecting the data type.

Additionally, or alternatively, the policy implementation system 100 determines data types stored in one or more data sources and uses the determined data types to implement purpose-based access controls. For instance, the policy implementation system 100 can determine that access to certain data (e.g., web form data) may be subject to a particular purpose for accessing the data. To illustrate, a storage computing system may receive a request for credit card data or other financial data stored on the storage computing system to use in processing a purchase for a first data subject via a website.

In an additional example, the storage computing system may receive a second request for credit card data to use in displaying to a second data subject on the website to remind the second data subject of the credit card data previously saved to use in purchases (e.g., in a cookie). In such an example, the credit card data (e.g., entire credit card number) may not necessarily be needed for display to the second data subject, while a portion of the credit card data (e.g., a partially obfuscated or modified credit card number) may be sufficient for identification by the data subject. Therefore, the storage computing system may determine specific access controls for the credit card data based on the different purposes associated with the requests for the credit card data. Such access controls may not only be applicable with respect to the entity requesting access to the data, but may also be applicable to how the data is displayed (e.g., modified) or used once accessed by the entity.

In either case, improved methods for classifying data contained in a storage system (i.e., determining that data source X includes credit card data) by the policy implementation system 100 facilitates the application of access-control policies (e.g., which implement certain purpose restrictions) that selectively modify datasets returned in response to a query so that the datasets are compliant with the purpose restrictions implemented via the access-control policies. For instance, a user of the computing environment that includes the data sources may have an account with a certain role that is assigned certain permissions. The permissions may allow access to certain types of data in certain types of data source for certain purposes associated with the role. Thus, the policy implementation system 100 facilitates purpose-based access control to data based on the classification applied to the data. This ensures that the personal data is only accessed by authorized users (e.g., user accounts) for authorized purposes.

In one or more specific examples, the policy implementation system 100 assists in the automated detection and remediation of changes to a computing environment in view of one or more data retention policies. For example, the policy implementation system 100 accesses a data map representing the computing environment in connection with a certain type of data stored in a data source, such as personal data or other data considered sensitive for legal, regulatory, or policy reasons (e.g., in response to a change to the data map or based on a periodic analysis of the data map). The policy implementation system 100 also detects one or more dates associated with the data (e.g., data of a document's creation, date contained within a document, etc.). The combination of the determined type of data plus other criteria, such as the date, indicates that retention of the data constitutes a policy violation, such as a data retention policy. A software program or suite that includes the policy implementation system 100 or that communicates with the policy implementation system 100 (e.g., via an integration between the software program and the policy implementation system 100) can automatically delete (or automatically prompt a user to delete) the data that violates the policy.

For example, the policy implementation system 100 may determine that a data source is missing data associated with a particular classification of data. The policy implementation system 100 can traverse a decision tree (e.g., such as the decision tree 500 of FIG. 5) to determine one or more actions to take regarding the missing data associated with the particular classification of data. For example, the policy implementation system 100 can determine one or more policies relating to the particular classification of data. For example, the policy implementation system 100 can determine that acquiring the missing data is required by an organization's data retention policy, as well as control measures associated with acquiring, storing, and/or otherwise using the missing data. Responsive to determining that acquiring the missing data is required, the policy implementation system 100 can initiate the scanning request 802 to acquire the missing data.

Although FIG. 8 illustrates that the policy implementation system 100 utilizes a plurality of components within a cloud-based system and a plurality of components at on premises devices of a single entity, the policy implementation system 100 can implement data prioritization scanning for a plurality of entities. To illustrate, the policy implementation system 100 can integrate separate synchronizing systems, scan job managers, and scanning systems at computing devices of each entity that issues a scanning request to the components within the cloud-based system. For instance, the policy implementation system 100 can utilize the scan control 806 to manage scanning requests for a plurality of entities and communicate with a plurality of separate synchronizing systems at different computing devices of the different entities.

Additionally, as mentioned above, the policy implementation system 100 can utilize a first set of operations to manage the scan control 806 for implementing the scanning request 802 and providing the results 826 of the scanning request via the client device 800 at a first computing system (e.g., a cloud-based computing system). Additionally, the policy implementation system 100 can utilize a second set of operations to manage the synchronizing system 810, the scan job manager 814, and scanning systems 816 to scan data in digital data repositories 818 and classify the data utilizing a classification model 822 at a second computing system (e.g., one or more computing devices or servers at one or more locations of an entity). In some aspects, the policy implementation system 100 utilizes one or more other configurations, such that one or more portions described above in connection with the first computing system are instead part of the second computing system, or vice-versa. Thus, the policy implementation system 100 can utilize several different computing devices (e.g., cloud-based devices or on premises devices) to perform various operations associated with classifying and routing digital content items. In additional aspects, the policy implementation system 100 performs one or more operations described herein by utilizing one or more software applications at one or more computing devices to generate instructions that cause one or more additional computing devices to perform one or more computing operations. As an example, a cloud-based computing application classifies a digital content item by generating instructions that cause a server on premises of an entity to utilize a classification model to generate a classification for the digital content item.

In one or more aspects, the components deployed on the computing device(s) of the entity are part of a discovery agent for detecting data sources, datasets, and data types via data extraction and classification. The policy implementation system 100 can utilize the discovery agent to identify a data source, scan the data source, tag the data source (e.g., tag data in the data source), and send and classify the respective set of data in accordance with the tagged data. In some instances, by utilizing the discovery agent, the policy implementation system 100 generates metadata associated with the digital content items to indicate results of the scanning and classification by the discovery agent. Additionally, the discovery agent can include one or more virtual machines for storing data and/or including/executing scanning operations or classifying operations.

In additional aspects, the policy implementation system 100 configures the discovery agent to reduce an impact on a performance of the computing devices, servers, etc. For instance, the queue priority management system can configure the discovery agent to utilize bandwidth throttling techniques, such as by limiting scanning and other processing steps to non-peak times. The policy implementation system 100 can also configure the discovery agent to limit performance of such operations to backup applications and data storage locations (e.g., by using sampling techniques to decrease a number of files to scan during the data discovery process).

In additional aspects, the policy implementation system 100 generates data objects for each dataset or group of data in a digital data repository. For example, in response to determining that a particular set of data is a training dataset associated with a particular artificial intelligence model, the queue priority management system can generate a data object for the dataset. The policy implementation system 100 can also assign attributes to the data object based on attributes of the dataset. To illustrate, the policy implementation system 100 can store information with the data object indicating a purpose of the dataset, a priority level or data type of the dataset, or one or more other data components associated with the dataset (e.g., an artificial intelligence model). The policy implementation system 100 can also classify the data object associated with the dataset into a corresponding category (e.g., based on the priority level or data type).

Figure 9:
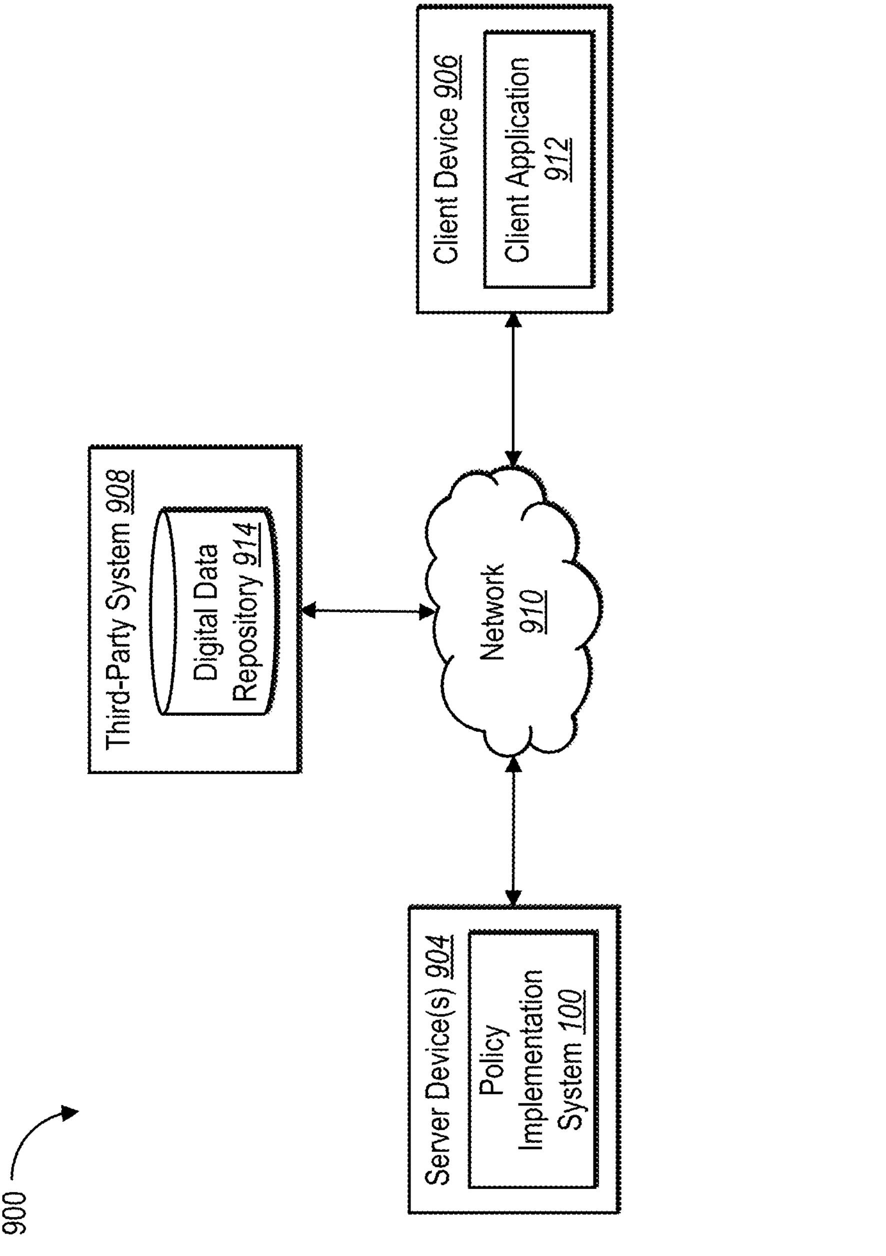
FIG. 9 illustrates an example of a system environment in which a policy implementation system can operate in accordance with one or more aspects.

FIG. 9 includes an aspect of a system environment 900 in which a policy implementation system 100 is implemented. In particular, the system environment 900 includes server device(s) 904, a client device 906, and a third-party computing system 908 in communication via a network 910. Moreover, as shown, the client device 906 includes a client application 912. In addition, the third-party computing system 908 includes a digital data repository 914.

As shown in FIG. 9, in one or more aspects, the server device(s) 904 include or host the policy implementation system 100. Specifically, the policy implementation system 100 includes, or is part of, one or more systems that utilize one or more data processes or other data processes to process digital data and/or provide other services associated with the third-party computing system 908. For example, the policy implementation system 100 (or another system) provides tools to the client device 906 for managing data associated with an entity for performing various data processes for the entity. In at least some aspects, the policy implementation system 100 provides tools to the client device 906 via the client application 912 for viewing and managing information associated with data that the entity handles, including data stored at one or more digital data repositories (e.g., the digital data repository 914) of the third-party computing system 908. In one or more aspects, the policy implementation system 100 installs or communicates with software at the client device (e.g., via the client application 912) and/or at the third-party computing system 908 to extract data and perform one or more data processes on the data in connection with managing controls related to one or more data policies.

As mentioned, the policy implementation system 100 also provides tools for generating and managing a data map by determining digital data stored at one or more computing devices, digital assets involved with handling digital data, or data processing activities utilizing the digital data and digital assets in connection with a data policy. To illustrate, the policy implementation system 100 scans and classifies data at the digital data repository 914 to determine compliance of the data at the digital data repository 914 according to the data policy. Additionally, in connection with scanning and classifying the data at the digital data repository 914, the policy implementation system 100 traverses a decision tree to determine various aspects of the digital data, such as an access type and/or attributes of the data at the digital data repository 914. Responsive to traversing the decision tree, the policy implementation system 100 determines sensitivity level, one or more control measures, and/or a policy basis for scanning and/or storing data at the digital data repository 914.

According to one or more aspects, the policy implementation system 100 manages data objects by communicating with the client device 906 and/or the third-party computing system 908. Specifically, the policy implementation system 100 can communicate with the client device 906 and/or the third-party computing system 908 to generate data objects representing data and/or to determine or otherwise obtain information associated with the data objects. The policy implementation system 100 may be configured to communicate with the client device 906 and/or the third-party computing system 908 on behalf of the entity via an integration that is configured with the entity's credentials (e.g., via an integrated data extraction software application). The policy implementation system 100 can obtain metadata or other information about the infrastructure or functions used by the entity and thereby populate attributes of the data objects with this information.

In additional aspects, the policy implementation system 100 communicates with the client device 906 to obtain information associated with the data objects or to provide information about the data objects for display within the client application 912. For instance, the policy implementation system 100 can obtain, via user input received from an administrator client device, metadata or other information about the infrastructure or functions used by the entity and thereby populate attributes of the data objects with this information. Furthermore, the policy implementation system 100 can receive inputs from the client device 906 to generate or modify a data map and/or perform operations at one or more computing systems associated with the data map. The policy implementation system 100 can also utilize information generated in connection with detecting missing data to generate messages and notifications to provide for display at the client device 906.

In one or more aspects, the third-party computing system 908 includes a server device, an individual client device, or another computing device associated with an entity. For instance, the third-party computing system 908 includes one or more computing devices for performing a data process involving handling data associated with one or more operations of the entity subject to a particular data policy. To illustrate, the third-party computing system includes one or more server devices that generate, process, store, or transmit payment card processing data subject to PCI DSS in one or more jurisdictions and are therefore covered by one or more corresponding data policies.

In one or more aspects, the server device(s) 904 include a variety of computing devices, including those described below with reference to FIG. 11. For example, the server device(s) 904 includes one or more servers for storing and processing data associated with one or more data processes. In some aspects, the server device(s) 904 also include a plurality of computing devices in communication with each other, such as in a distributed storage environment. In some aspects, the server device(s) 904 include a content server. The server device(s) 904 also optionally includes an application server, a communication server, a web-hosting server, a social networking server, a digital content campaign server, or a digital communication management server.

In one or more aspects, the client device 906 includes, but is not limited to, a desktop, a mobile device (e.g., smartphone or tablet), or a laptop including those explained below with reference to FIG. 11. Furthermore, although not shown in FIG. 9, the client device 906 can be operated by users (e.g., a user included in, or associated with, the system environment 900) to perform a variety of functions. In particular, the client device 906 performs functions such as, but not limited to, accessing, viewing, and interacting with data associated with data processes associated with one or more data policies. In some aspects, the client device 906 also performs functions for generating, capturing, or accessing data to provide to the policy implementation system 100 in connection with detecting missing data. For example, the client device 906 communicates with the server device(s) 904 via the network 910 to provide information (e.g., user interactions) associated with data processes. Although FIG. 9 illustrates the system environment 900 with a single client device, in some aspects, the system environment 900 includes a plurality of client devices.

Additionally, as shown in FIG. 9, the system environment 900 includes the network 910. The network 910 enables communication between components of the system environment 900. In one or more aspects, the network 910 may include the Internet or World Wide Web. Additionally, the network 910 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 904, the client device 906, and the third-party system communicate via the network using one or more communication platforms and technologies suitable for transporting data and/or communication signals, including any known communication technologies, devices, media, and protocols supportive of data communications, examples of which are described with reference to FIG. 11.

Although FIG. 9 illustrates the server device(s) 904, the client device 906, and the third-party computing system 908 communicating via the network 910, in additional or alternative aspects, the various components of the system environment 900 communicate and/or interact via other methods (e.g., the server device(s) 904, the client device 906, and/or the third-party computing system 908 can communicate directly). Furthermore, in some aspects, the policy implementation system 100 includes the digital data repository 914 in connection with data processes of the third-party computing system 908. In additional aspects, the client device 906 or another device includes the digital data repository 914.

In some aspects, the server device(s) 904 support the policy implementation system 100 on the client device 906. For instance, the server device(s) 904 generates/maintains the policy implementation system 100 and/or one or more components of the policy implementation system 100 for the client device 906. The server device(s) 904 provides the policy implementation system 100 to the client device 906 (e.g., as part of a software application/suite). In other words, the client device 906 obtains (e.g., downloads) the policy implementation system 100 from the server device(s) 904. At this point, the client device 906 is able to utilize the policy implementation system 100 to manage compliance of data processes according to one or more data policies and/or detect missing data independently from the server device(s) 904.

In additional or alternative aspects, the policy implementation system 100 includes a web hosting application that allows the client device 906 to interact with content and data processes hosted on the server device(s) 904. To illustrate, in one or more aspects, the client device 906 accesses a web page supported by the server device(s) 904. The client device 906 provides input to the server device(s) 904 to perform missing data detection or compliance management operations, and in response, the policy implementation system 100 on the server device(s) 904 performs operations to view/manage data associated with detected missing data. The server device(s) 904 provide the output or results of the operations to the client device 906.

FIGS. 1-9, the corresponding text, and the examples provide a number of different systems and methods for traversing a decision tree to determine one or more recommended actions in response to detecting a change in a data map. In addition to the foregoing, implementations can also be described in terms of flowcharts comprising acts or steps in a method for accomplishing a particular result. For example, FIG. 10 illustrates an example series of acts for utilizing a decision tree to generate a recommended action in response to detecting a change in a data map.

Figure 10:
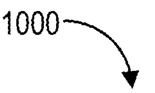
FIG. 10 illustrates an example flowchart of a process for determining a data map representing data objects, determining changes to the data map, and generating a recommended action according to the change to the data map.
Figure 10:
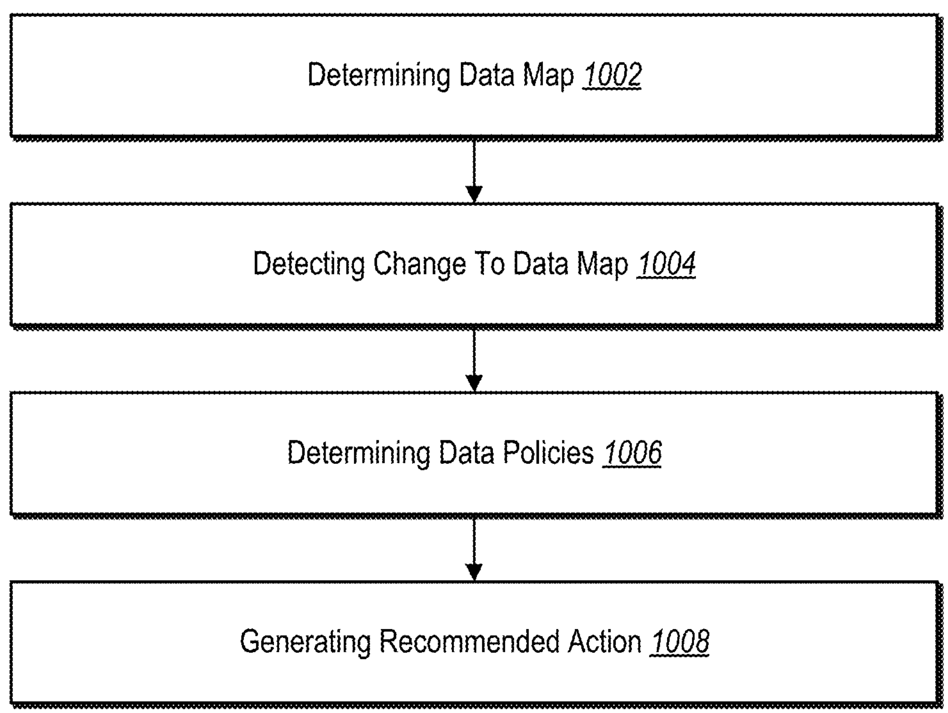

While FIG. 10 illustrates acts according to certain implementations, alternative implementations may omit, add to, reorder and/or modify any of the acts shown in FIG. 10. The acts of FIG. 10 can be performed as part of a computer-implemented method. Alternatively, a non-transitory computer readable medium can comprise instructions that, when executed by one or more processors, cause a computing device to perform the acts of FIG. 10. In still further implementations, a system can perform the acts of FIG. 10.

As shown, the process 1000 includes an act 1002 of determining a data map. In some aspects, act 1002 is implemented using one or more examples described above with respect to FIGS. 1 and 2. The process 1000 also includes an act 1004 of detecting a change to the data map. In some embodiments, the act 1004 is implemented using one or more examples as described above with respect to FIGS. 1, 2, and 4. Additionally, the process 1000 includes an act 1006 of determining data policies. In some aspects, the act 1006 is implemented using one or more examples as described above with respect to FIGS. 1, 2, 4, 7A and 7B. Additionally, the process 1000 includes an act 1008 of generating a recommended action. In some aspects, act 1008 is implemented using one or more examples described above with respect to FIGS. 1, 2, 7A and 7B.

In one or more aspects, the act 1002 can include determining, by one or more hardware processors, a data map comprising a plurality of data objects representing digital assets, digital data stored on the digital assets, and data processing activities involving the digital assets. The act 1004 can include detecting, by the one or more hardware processors, a change to the data map based on one or more changes to one or more data objects of the plurality of data objects. The act 1006 can include determining, by the one or more hardware processors, one or more data policies comprising digital data requirements corresponding to the one or more data objects. The act 1008 can include generating, by the one or more hardware processors utilizing a decision tree generated based on the one or more data policies, a recommended action for modifying the digital assets, the digital data, or the data processing activities by executing one or more application programing interface calls according to the one or more changes to the one or more data objects and the digital data requirements of the one or more data policies.

In one or more aspects, the process 1000 includes, in response to detecting the one or more changes to the one or more data objects of the plurality of data objects, determining attributes of the one or more data objects. The process 1000 can also include determining the one or more data policies corresponding to the one or more data objects according to the attributes of the one or more data objects.

The process 1000 can also include generating the recommended action by generating, utilizing the decision tree, the recommended action for modifying the digital assets, the digital data, or the data processing activities according to the attributes of the one or more data objects.

The process 1000 can also include determining the attributes of the one or more data objects by determining a data object type, a sensitivity level, or a geographic location of a data object of the one or more data objects.

The process 1000 can include determining, based on the one or more data policies, one or more nodes of the decision tree corresponding to the one or more data objects in the data map. Additionally, the process 1000 can include executing the one or more application programming interface calls from among a plurality of application interface calls to traverse the decision tree according to the one or more nodes of the decision tree and one or more edges connecting the one or more nodes.

The process 1000 can additionally include generating the decision tree by determining one or more jurisdiction attributes corresponding to the one or more data policies, a set of data objects indicated in the digital data requirements of the one or more data policies, and possible actions corresponding to the digital data requirements of the one or more data policies. Moreover, the process 1000 can include generating nodes indicating the one or more jurisdiction attributes, the set of data objects, and the possible actions, the nodes linked by edges indicating relationships between the one or more jurisdiction attributes, the set of data objects, and the possible actions according to the one or more data policies.

In some embodiments, the process 1000 can further include executing the one or more application programming interface calls by traversing the nodes and the edges in the decision tree based on attributes of the one or more data objects corresponding to the one or more changes to determine the recommended action from the possible actions.

In one or more embodiments, the process 1000 can include, in connection with generating the recommended action, causing a computing device associated with the plurality of data objects to execute the recommended action for modifying the digital assets, the digital data, or the data processing activities by implementing a control measure according to the digital data requirements. The process 1000 can include detecting a change to the one or more data policies. Additionally, the process 1000 can include generating a modified decision tree by modifying one or more nodes of the decision tree based on the change to the one or more data policies. Moreover, the process 1000 can include generating, utilizing the modified decision tree, one or more recommended actions for modifying at least one data object of the plurality of data objects by executing one or more additional application programming interface calls.

In some embodiments, the process 1000 includes determining a data map comprising a plurality of data objects representing digital assets associated with an entity, digital data stored on the digital assets, and data processing activities involving the digital assets. Additionally, the process 1000 can include detecting a change to the data map based on one or more changes to one or more data objects of the plurality of data objects. Indeed, the process 1000 can include generating, utilizing a decision tree determined based on one or more data policies comprising digital data requirements corresponding to the one or more data objects, a recommended action for modifying the digital assets, the digital data, or the data processing activities by executing one or more application programming interface calls according to the one or more changes to the one or more data objects and the digital data requirements of the one or more data policies. Further, the process 1000 can include causing one or more computing devices to execute the recommended action for modifying the digital assets, the digital data, or the data processing activities.

In one or more embodiments, the process 1000 includes determining attributes of the one or more data objects corresponding to the change to the data map. Further, the process 1000 can include determining the one or more data policies corresponding to the one or more data objects according to the attributes of the one or more data objects.

Additionally, the process 1000 can include generating the recommended action by generating, utilizing the decision tree, the recommended action for modifying the digital assets, the digital data, or the data processing activities according to the attributes of the one or more data objects.

In some embodiments, the process 1000 can include determining attributes of the one or more data objects including a data object type, a sensitivity level of the one or more data objects, or a geographic location corresponding to the one or more data objects.

In one or more embodiments, the process 1000 can include executing the one or more application programming interface calls from among a plurality of application interface calls to traverse the decision tree according to the data object type, the sensitivity level of the one or more data objects, or of the geographic location corresponding to the one or more data objects.

Additionally, in some embodiments, the process 1000 can include detecting the change to the data map in response to detecting that a data object representing a particular digital asset, digital data stored on the particular digital asset, or a data processing activity involving the particular digital asset is added to the data map.

The process 1000 can include detecting the change to the data map in response to detecting that an attribute of a data object representing a particular digital asset, digital data stored on the particular digital asset, or a data processing involving the particular digital asset is modified.

In some embodiments, the process 1000 can include detecting one or more changes to one or more data objects of a plurality of data objects of a data map, the plurality of data objects representing digital assets associated with an entity, digital data stored on the digital assets, and data processing activities involving the digital assets. The process 1000 can include determining one or more data policies comprising digital data requirements corresponding to the one or more data objects. Additionally, the process 1000 can include determining a decision tree comprising a plurality of nodes and relationships between the plurality of nodes based on the digital data requirements of the one or more data policies. Moreover, the process 1000 can include generating, by traversing the decision tree using attributes of the one or more data objects, a recommended action for modifying the digital assets, the digital data, or the data processing activities by executing one or more application programming interface calls according to the one or more changes to the one or more data objects and the digital data requirements of the one or more data policies.

Indeed, the process 1000 can include causing one or more computing devices to execute the recommended action for modifying the digital assets, the digital data, or the data processing activities.

The process 1000 can include generating the decision tree by determining that the one or more data policies comprise the digital data requirements for a set of data objects. Moreover, the process 1000 can include generating the decision tree by determining a set of possible actions corresponding to the set of data objects and the digital data requirements. The process 1000 can include generating the decision tree by generating a plurality of nodes representing the set of data objects and the set of possible actions and edges linking the plurality of nodes according to the digital data requirements.

Indeed, the process 1000 can include generating the recommended action by determining, for a data object of the one or more data objects, a data object type, a sensitivity level, or a geographic location. Moreover, the process 1000 can include generate the recommended action for the data object by executing the one or more application programming interface calls to traverse the decision tree according to the data object type, the sensitivity level, or the geographic location of the data object.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media. Non-transitory computer-readable storage media (devices) includes optical and/or non-optical memory, disks, or caches that store computer data interpretable by one or more processors to execute particular functions as described herein. A "network" is defined as one or more data links that enable the transport of electronic data between computer systems and/or modules and/or other electronic devices. Information is transferred or provided over a network (either hardwired, wireless, or a combination of hardwired or wireless) to a computer to carry program code in the form of computer-executable instructions or data structures and which can be accessed by a general purpose or special purpose computer.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code.

Embodiments of the present disclosure can also be implemented in cloud computing environments. In this description, "cloud computing" is defined as a model for enabling on-demand network access to a shared pool of configurable computing resources. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth.

Figure 11:
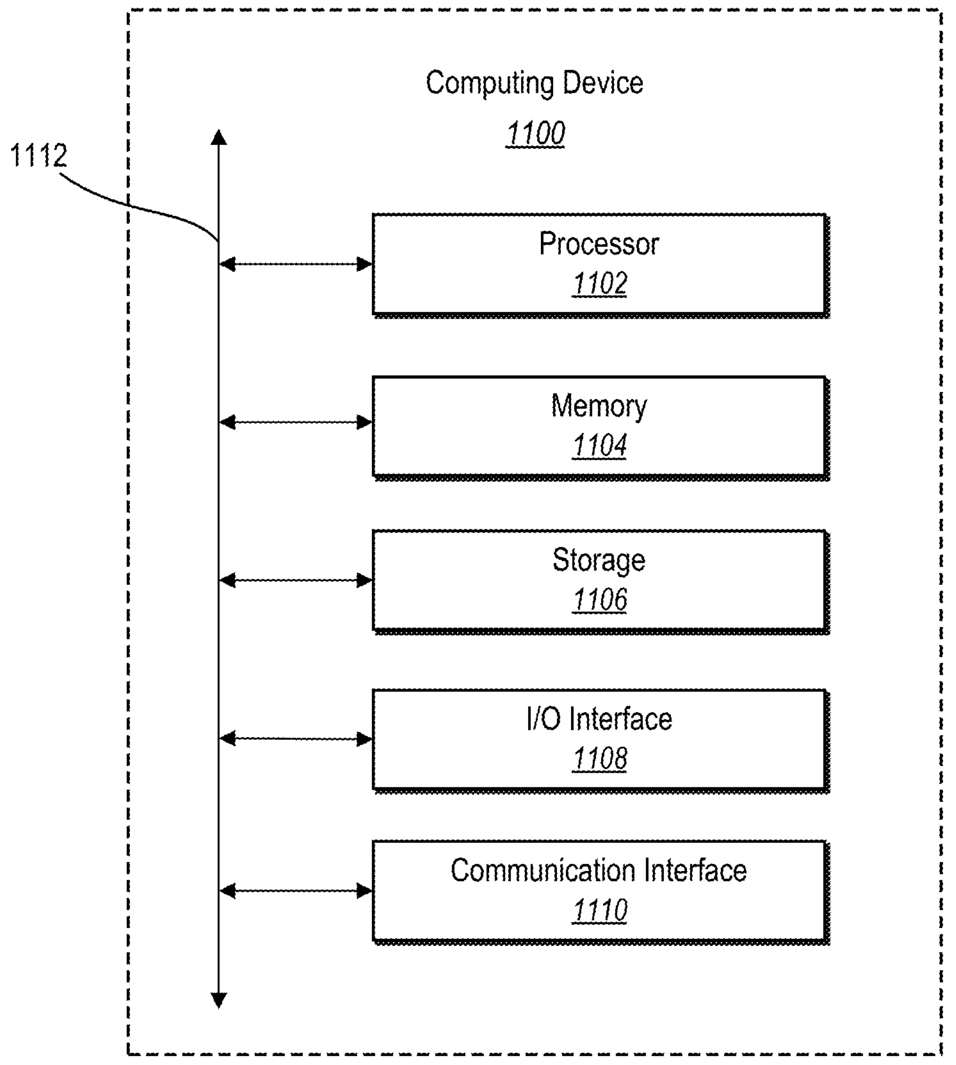
FIG. 11 illustrates an example of a computing device in accordance with one or more aspects.

FIG. 11 illustrates, in block diagram form, an example computing device 1100 (e.g., the computing device 1100, the client device(s) 904, and/or the server device(s)) that may be configured to perform one or more of the processes described above. As shown by FIG. 11, the computing device can comprise a processor(s) 1102, memory 1104, a storage device 1106, an I/O interface 1108, and a communication interface 1110.

In particular embodiments, processor(s) 1102 includes hardware for executing instructions, such as those making up a computer program. As an example, and not by way of limitation, to execute instructions, processor(s) 1102 may retrieve (or fetch) the instructions from an internal register, an internal cache, memory 1104, or a storage device 1106 and decode and execute them. The computing device 1100 includes memory 1104, which is coupled to the processor(s) 1102. The memory 1104 may be used for storing data, metadata, and programs for execution by the processor(s). The memory 1104 may include one or more of volatile and non-volatile memories. The memory 1104 may be internal or distributed memory. The computing device 1100 includes a storage device 1106 includes storage for storing data or instructions. As an example, and not by way of limitation, storage device 1106 can comprise a non-transitory storage medium described above. The computing device 1100 also includes one or more input or output ("I/O") devices/interfaces 1108, which are provided to allow a user to provide input to (such as user strokes), receive output from, and otherwise transfer data to and from the computing device 1100. These I/O devices/interfaces 1108 may include a mouse, keypad or a keyboard, a touch screen, camera, optical scanner, network interface, modem, other known I/O devices or a combination of such I/O devices/interfaces 1108.

The computing device 1100 can further include a communication interface 1110. The communication interface 1110 can include hardware, software, or both. The communication interface 1110 can provide one or more interfaces for communication (such as, for example, packet-based communication) between the computing device and one or more other computing devices (e.g., computing device 1100) or one or more networks. The computing device 1100 can further include a bus 1112. The bus 1112 can comprise hardware, software, or both that couples components of computing device 1100 to each other.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method comprising:

determining, by one or more hardware processors, a data map comprising a plurality of data objects representing digital assets, digital data stored on the digital assets, and data processing activities involving the digital assets;

detecting, by the one or more hardware processors, a change to the data map based on one or more changes to one or more data objects of the plurality of data objects;

based on detecting the one or more changes to the one or more data objects of the plurality of data objects, determining by the one or more hardware processors attributes of the one or more data objects;

determining, by the one or more hardware processors, one or more data policies comprising digital data requirements corresponding to the one or more data objects and according to the attributes of the one or more data objects;

generating, by the one or more hardware processors utilizing a decision tree generated based on the one or more data policies, a recommended action for modifying the digital assets, the digital data, or the data processing activities by executing one or more application programming interface calls according to the one or more changes to the one or more data objects and the digital data requirements of the one or more data policies; and causing, based on the recommended action, a computing device associated with the plurality of data objects to execute the recommended action for modifying the digital assets, the digital data, or the data processing activities by implementing a control measure according to the digital data requirements.

2. The computer-implemented method of claim 1, wherein generating the recommended action comprises generating, utilizing the decision tree, the recommended action for modifying the digital assets, the digital data, or the data processing activities according to the attributes of the one or more data objects.

3. The computer-implemented method of claim 1, wherein determining the attributes of the one or more data objects comprises determining a data object type, a sensitivity level, or a geographic location of a data object of the one or more data objects.

4. The computer-implemented method of claim 1, further comprising: determining, based on the one or more data policies, one or more nodes of the decision tree corresponding to the one or more data objects in the data map; and executing the one or more application programming interface calls from among a plurality of application interface calls to traverse the decision tree according to the one or more nodes of the decision tree and one or more edges connecting the one or more nodes.

5. The computer-implemented method of claim 1, further comprising generating the decision tree by: determining one or more jurisdiction attributes corresponding to the one or more data policies, a set of data objects indicated in the digital data requirements of the one or more data policies, and possible actions corresponding to the digital data requirements of the one or more data policies; and generating nodes indicating the one or more jurisdiction attributes, the set of data objects, and the possible actions, the nodes linked by edges indicating relationships between the one or more jurisdiction attributes, the set of data objects, and the possible actions according to the one or more data policies.

6. The computer-implemented method of claim 5, wherein executing the one or more application programming interface calls comprises traversing the nodes and the edges in the decision tree based on attributes of the one or more data objects corresponding to the one or more changes to determine the recommended action from the possible actions.

7. The computer-implemented method of claim 1, further comprising: detecting a change to the one or more data policies; generating a modified decision tree by modifying one or more nodes of the decision tree based on the change to the one or more data policies; and generating, utilizing the modified decision tree, one or more recommended actions for modifying at least one data object of the plurality of data objects by executing one or more additional application programming interface calls.

8. The computer-implemented method of claim 1, wherein the control measure comprises one or more of: redacting specific data types from digital content items, encrypting specific data types, grouping specific data types, excluding specific data types from communications, implementing specific database operations for computing devices that handle data types, monitoring physical environments, installing environmental protections, restricting or reviewing access authorization to physical data centers, installing physical security controls, implementing specific security or privacy rules within an organization, deleting a data type found to be in violation of a data policy, or generating a notification requesting information found to be missing.

9. A system comprising:

one or more non-transitory computer-readable media; and processing hardware configured to cause the system to:

determine a data map comprising a plurality of data objects representing digital assets associated with an entity, digital data stored on the digital assets, and data processing activities involving the digital assets;

detect a change to the data map based on one or more changes to one or more data objects of the plurality of data objects;

determine attributes of the one or more data objects corresponding to the change to the data map;

determine one or more data policies corresponding to the one or more data objects according to the attributes of the one or more data objects;

generate, utilizing a decision tree determined based on the one or more data policies comprising digital data requirements corresponding to the one or more data objects, a recommended action for modifying the digital assets, the digital data, or the data processing activities by executing one or more application programming interface calls according to the one or more changes to the one or more data objects and the digital data requirements of the one or more data policies; and cause one or more computing devices, being implemented by one or more processors, to execute the recommended action for modifying the digital assets, the digital data, or the data processing activities by implementing a control measure according to the digital data requirements.

10. The system of claim 9, wherein the processing hardware is further configured to generate the recommended action by generating, utilizing the decision tree, the recommended action for modifying the digital assets, the digital data, or the data processing activities according to the attributes of the one or more data objects.

11. The system of claim 9, wherein the processing hardware is further configured to determine the attributes of the one or more data objects including a data object type, a sensitivity level of the one or more data objects, or a geographic location corresponding to the one or more data objects.

12. The system of claim 11, wherein the processing hardware is further configured to execute the one or more application programming interface calls from among a plurality of application interface calls to traverse the decision tree according to the data object type, the sensitivity level of the one or more data objects, or the geographic location corresponding to the one or more data objects.

13. The system of claim 9, wherein the processing hardware is further configured to detect the change to the data map in response to detecting that a data object representing a particular digital asset, digital data stored on the particular digital asset, or a data processing activity involving the particular digital asset is added to the data map.

14. The system of claim 9, wherein the processing hardware is further configured to detect the change to the data map in response to detecting that an attribute of a data object representing a particular digital asset, digital data stored on the particular digital asset, or a data processing activity involving the particular digital asset is modified.

15. The system of claim 9, wherein the control measure comprises one or more of: redacting specific data types from digital content items, encrypting specific data types, grouping specific data types, excluding specific data types from communications, implementing specific database operations for computing devices that handle data types, monitoring physical environments, installing environmental protections, restricting or reviewing access authorization to physical data centers, installing physical security controls, implementing specific security or privacy rules within an organization, deleting a data type found to be in violation of a data policy, or generating a notification requesting information found to be missing.

16. A non-transitory computer-readable medium comprising instructions that, when executed by processing hardware, cause the processing hardware to perform operations comprising:

detecting one or more changes to one or more data objects of a plurality of data objects of a data map, the plurality of data objects representing digital assets associated with an entity, digital data stored on the digital assets, and data processing activities involving the digital assets;

based on detecting the one or more changes to the one or more data objects of the plurality of data objects, determining attributes of the one or more data objects;

determining one or more data policies comprising digital data requirements corresponding to the one or more data objects and according to the attributes of the one or more data objects;

determining a decision tree comprising a plurality of nodes and relationships between the plurality of nodes based on the digital data requirements of the one or more data policies;

generating, by traversing the decision tree using the attributes of the one or more data objects, a recommended action for modifying the digital assets, the digital data, or the data processing activities by executing one or more application programming interface calls according to the one or more changes to the one or more data objects and the digital data requirements of the one or more data policies; and causing one or more computing devices, being implemented by one or more processors, to execute the recommended action for modifying the digital assets, the digital data, or the data processing activities by implementing a control measure according to the digital data requirements.

17. The non-transitory computer-readable medium of claim 16, wherein the operations further comprise generating the decision tree by: determining that the one or more data policies comprise the digital data requirements for a set of data objects; determining a set of possible actions corresponding to the set of data objects and the digital data requirements; and generating the decision tree by generating a plurality of nodes representing the set of data objects and the set of possible actions and edges linking the plurality of nodes according to the digital data requirements.

18. The non-transitory computer-readable medium of claim 16, wherein generating the recommended action comprises: determining, for a data object of the one or more data objects, a data object type, a sensitivity level, or a geographic location; and generating the recommended action for the data object by executing the one or more application programming interface calls to traverse the decision tree according to the data object type, the sensitivity level, or the geographic location of the data object.

19. The non-transitory computer-readable medium of claim 16, wherein the control measure comprises one or more of: redacting specific data types from digital content items, encrypting specific data types, grouping specific data types, excluding specific data types from communications, implementing specific database operations for computing devices that handle data types, monitoring physical environments, installing environmental protections, restricting or reviewing access authorization to physical data centers, installing physical security controls, implementing specific security or privacy rules within an organization, deleting a data type found to be in violation of a data policy, or generating a notification requesting information found to be missing.

* * * * *